Ss010071315B2

United States Patent
Watari et al.

(10) Patent No.: US 10,071,315 B2
(45) Date of Patent: Sep. 11, 2018

(54) CONTENT PROVIDING METHOD, CONTENT PROVIDING SERVER, AND CONTENT PROVIDING SYSTEM

(71) Applicant: Sony Computer Entertainment Inc., Tokyo (JP)

(72) Inventors: Yasuhiro Watari, Tokyo (JP); Nobuaki Tanaka, Saitama (JP); Toshiharu Sayano, Kanagawa (JP); Toshiya Ikenaga, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 671 days.

(21) Appl. No.: 14/314,155

(22) Filed: Jun. 25, 2014

(65) Prior Publication Data
US 2015/0018094 A1    Jan. 15, 2015

(30) Foreign Application Priority Data
Jul. 10, 2013  (JP) ................................. 2013-144891

(51) Int. Cl.
| G06F 17/00 | (2006.01) |
| A63F 13/60 | (2014.01) |
| A63F 13/352 | (2014.01) |
| A63F 13/355 | (2014.01) |

(52) U.S. Cl.
CPC ............ *A63F 13/60* (2014.09); *A63F 13/352* (2014.09); *A63F 13/355* (2014.09)

(58) Field of Classification Search
CPC ....... A63F 13/60; A63F 13/355; A63F 13/352
See application file for complete search history.

(56) References Cited

U.S. PATENT DOCUMENTS

| 6,488,505 B1 * | 12/2002 | Hightower ............. A63F 13/10 434/118 |
| 6,835,137 B1 | 12/2004 | Nakamura |
| 2000/2049086 | 4/2002 | Otsu Tamichi |

(Continued)

FOREIGN PATENT DOCUMENTS

| JP | 11253653 A | 9/1999 |
| JP | 2000051518 A | 2/2000 |

(Continued)

OTHER PUBLICATIONS

Office Action for corresponding Japanese Patent Application No. 2013-144891, 13 pages, dated May 23, 2017.

(Continued)

*Primary Examiner* — Dmitry Suhol
*Assistant Examiner* — Carl V Larsen
(74) *Attorney, Agent, or Firm* — Matthew B. Dernier, Esq.

(57) ABSTRACT

Disclosed herein is a content providing method for a content providing server to provide contents to client terminals via a network. The method includes: obtaining play data indicating progress conditions of a computer game progressing according to user operation on the client terminals; evaluating game plays by each predetermined evaluation item on a basis of the play data; obtaining data of a moving image of a game play extracted according to an evaluation result; and distributing the data of the moving image to the client terminals via the network.

17 Claims, 19 Drawing Sheets

(56) References Cited

U.S. PATENT DOCUMENTS

| | | | | |
|---|---|---|---|---|
| 2004/0225386 | A1* | 11/2004 | Thompson | A63F 13/12 700/92 |
| 2007/0060359 | A1* | 3/2007 | Smith | A63F 13/5258 463/42 |
| 2007/0191101 | A1* | 8/2007 | Coliz | A63F 13/12 463/42 |
| 2007/0288978 | A1* | 12/2007 | Pizzurro | H04N 21/64322 725/112 |
| 2008/0167122 | A1* | 7/2008 | Maeda | A63F 13/12 463/30 |
| 2009/0125968 | A1* | 5/2009 | Perlman | A63F 13/12 725/133 |
| 2011/0124417 | A1* | 5/2011 | Baynes | A63F 13/12 463/43 |
| 2013/0190096 | A1* | 7/2013 | Ronen | H04L 29/06034 463/43 |
| 2013/1072086 | | 7/2013 | Ikenaga | |
| 2014/0155174 | A1* | 6/2014 | Laakkonen | A63F 13/46 463/42 |

FOREIGN PATENT DOCUMENTS

| | | | |
|---|---|---|---|
| JP | 2000140413 | A | 5/2000 |
| JP | 2002197058 | A | 7/2002 |
| JP | 2004329949 | A | 11/2004 |
| JP | 2012038042 | A | 2/2012 |
| JP | 2012065831 | A | 4/2012 |
| JP | 2012105285 | A | 5/2012 |

OTHER PUBLICATIONS

Best Play Professional Baseball, ASCII, Japan, ASCII Corporation, vol. 23, No. 1, 4 pages, p. 333. (for relevancy see Office Action for corresponding Japanese Patent Application No. 2013-144891, 13 pages, dated May 23, 2017 cited above).

* cited by examiner

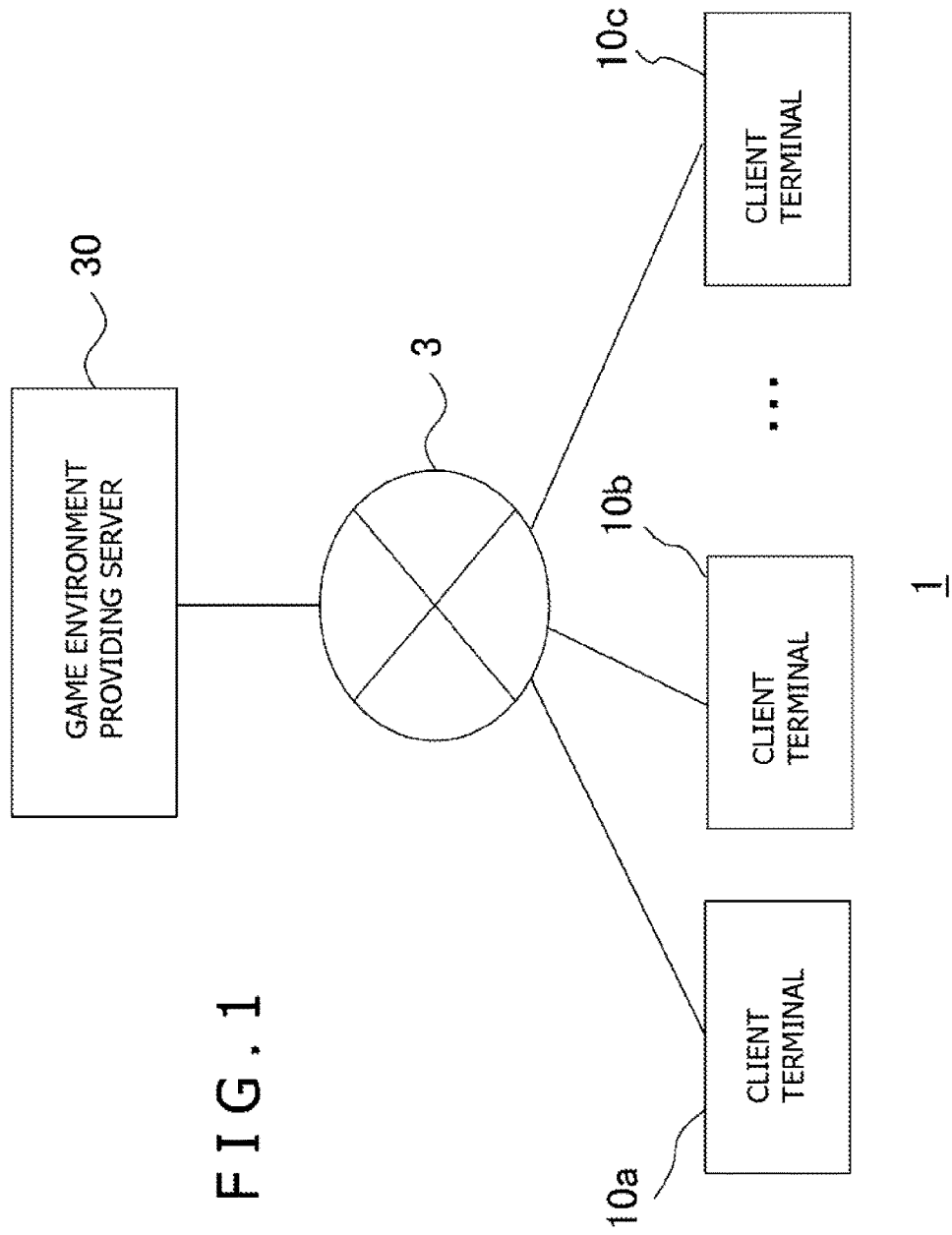

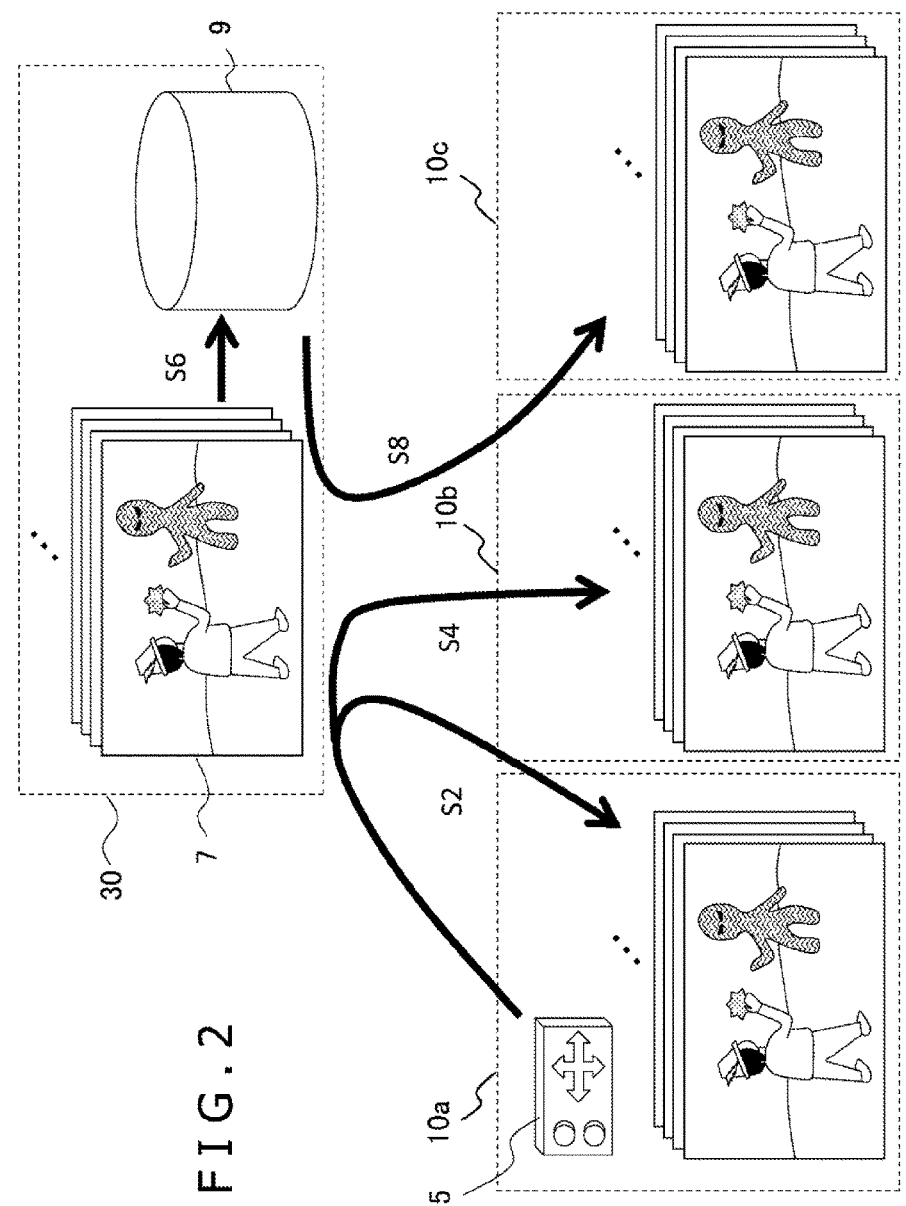

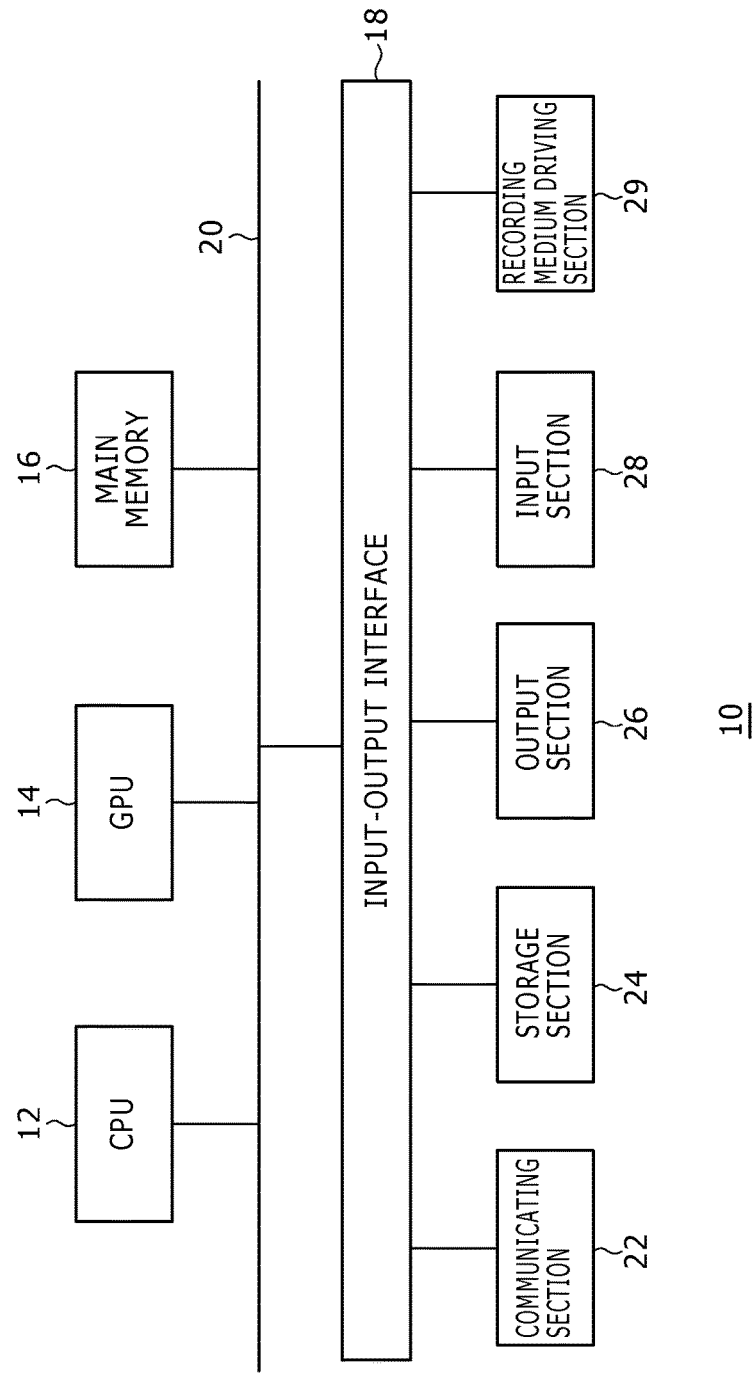

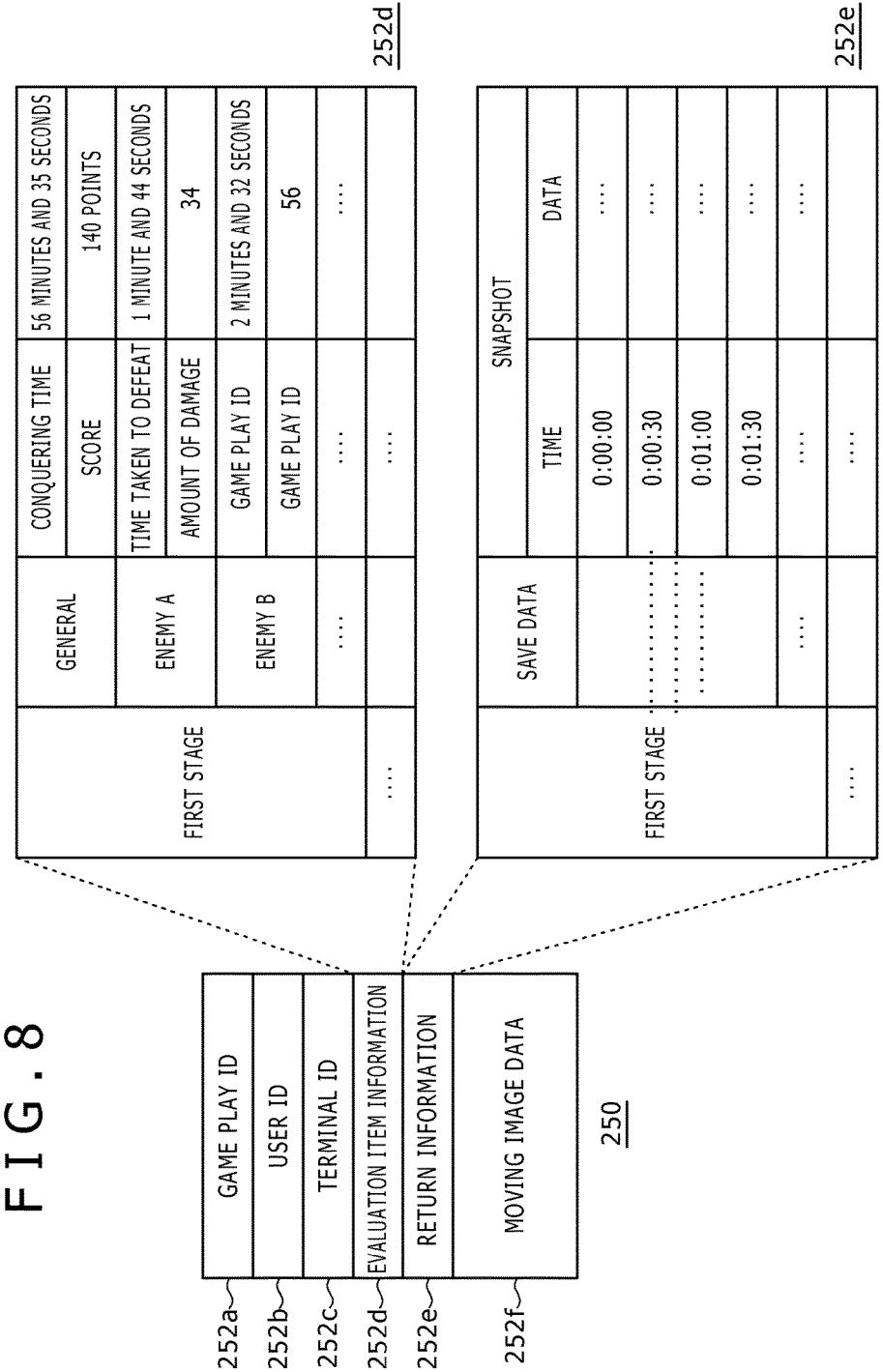

FIG. 9

| GAME TYPE | EVALUATION UNIT | EVALUATION ITEM |
|---|---|---|
| ROLE-PLAYING GAME | STAGE<br>CHARACTER LEVEL<br>RETAINED WEAPONS<br>VISITED TOWN<br>LEVEL/KIND OF DEFEATED ENEMY | CONQUERING TIME<br>NUMBER OF TIMES OF DEFEATING ENEMY, TIME TAKEN<br>TO DEFEAT ENEMY, AND AMOUNT OF DAMAGE<br>SCORE AND EXPERIENCE POINTS |
| FIGHTING GAME | KIND OF OPERATED CHARACTER<br>KIND OF ENEMY<br>STAGE | WIN-LOSS RATIO AND WINNING PERCENTAGE<br>NUMBER OF CONSECUTIVE TIMES OF SUCCESSFUL ATTACK<br>CONQUERING TIME AND AMOUNT OF DAMAGE BEFORE CONQUEST |
| PUZZLE | DEGREE OF DIFFICULTY | NUMBER OF CHAINS<br>CONTINUOUS PLAY TIME |
| ACTION/SHOOTING | STAGE<br>DEGREE OF DIFFICULTY | CONQUERING TIME<br>CONQUERING EFFICIENCY |
| ONLINE GAME | CHARACTER LEVEL<br>RETAINED WEAPONS<br>VISITED TOWN<br>LEVEL/KIND OF DEFEATED ENEMY | FIRST DEFEATED ENEMY AMONG PARTICIPANTS<br>FIRST OBTAINED ITEM AMONG PARTICIPANTS<br>EARNED MOST EXPERIENCE POINTS AMONG PARTICIPANTS |

| FILTERING ITEM | CONDITION VALUE |
|---|---|
| PURCHASE OF APPLICATION | PURCHASED |
| CONDITIONS OF TARGET GAME/STAGE | CLEARED |
| NUMBER OF TIMES OF PLAY | 20 TIMES OR MORE |
| OBTAINMENT OF ITEM | OBTAINED |
| LEVEL | LEVEL 3 OR HIGHER |
| NUMBER OF TIMES OF DEATH PER STAGE | 5 TIMES OR MORE |
| FRIEND REGISTRATION | REGISTERED |
| .... | .... |

FIG.11

| ITEM | ACTUAL VALUE |
|---|---|
| PURCHASE OF APPLICATION | PURCHASED |
| CONDITIONS OF TARGET GAME/STAGE | CLEARED |
| NUMBER OF TIMES OF PLAY | 15 TIMES |
| OBTAINMENT OF ITEM | UNOBTAINED |
| LEVEL | LEVEL 3 OR HIGHER |
| NUMBER OF TIMES OF DEATH PER STAGE | 4 TIMES |
| FRIEND REGISTRATION | NO REGISTRATION |
| .... | .... |

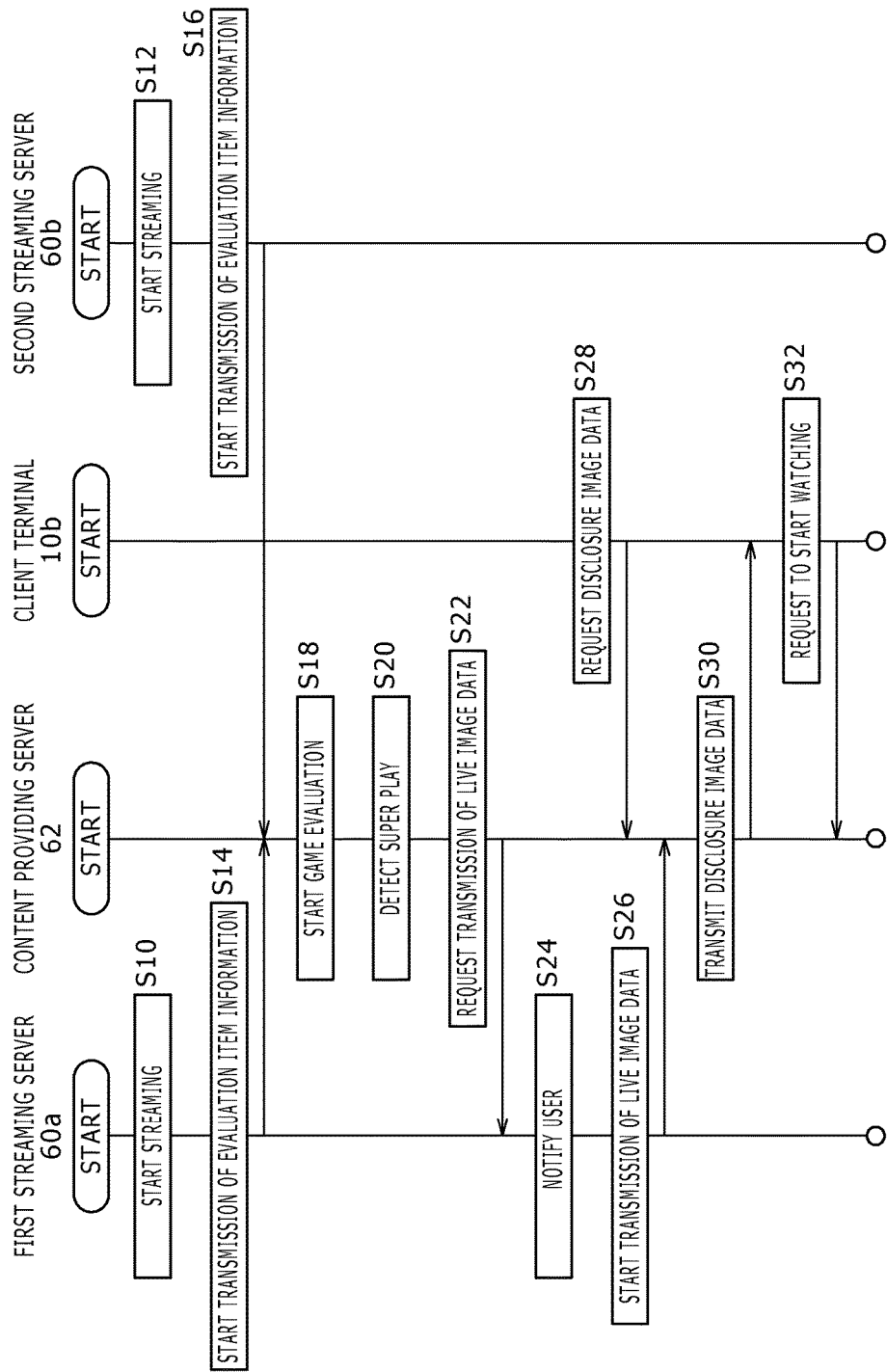

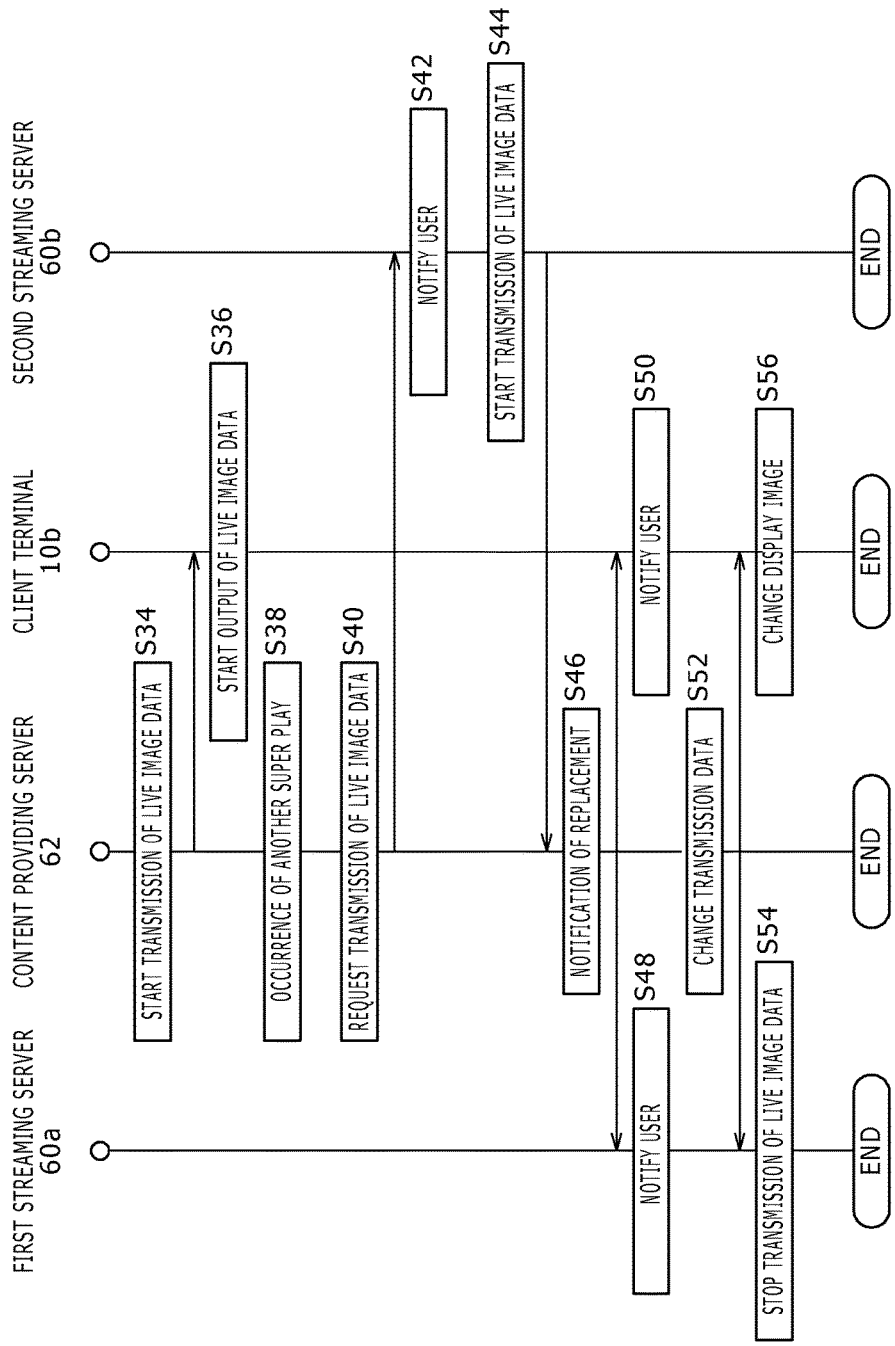

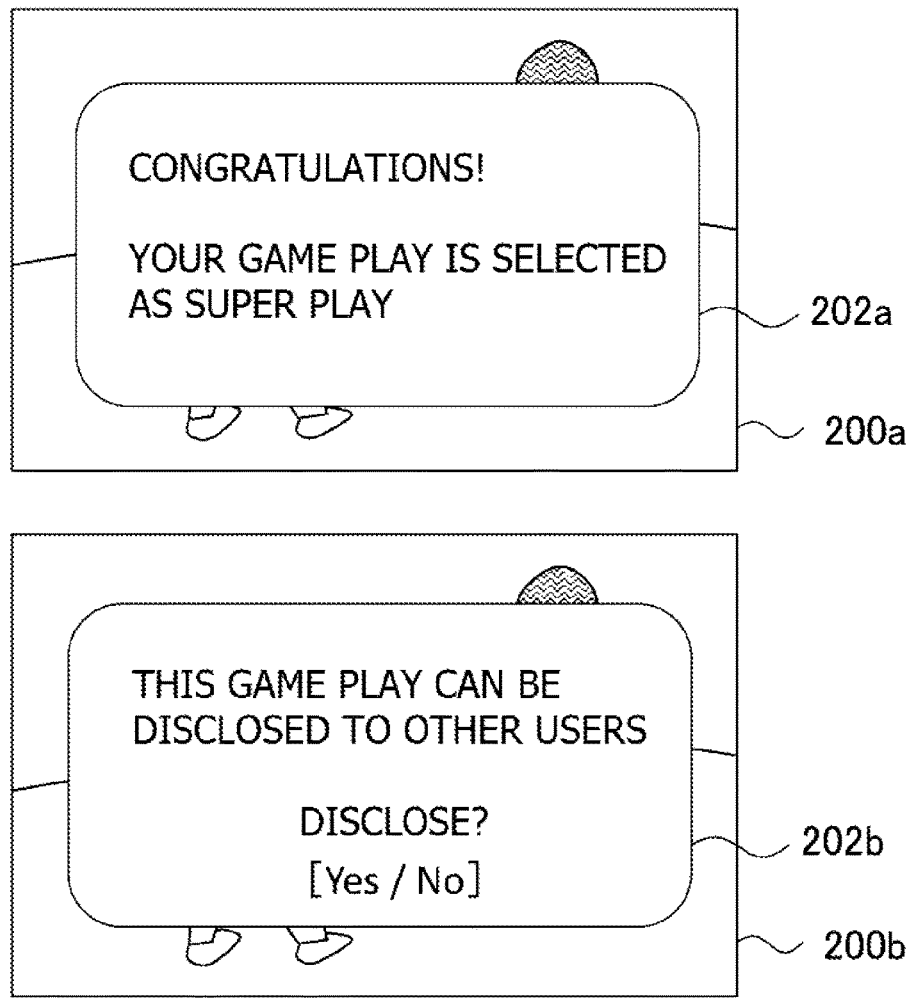
F I G . 1 4

CONTENT PROVIDING METHOD, CONTENT PROVIDING SERVER, AND CONTENT PROVIDING SYSTEM

BACKGROUND

The present disclosure relates to a technology for providing information processing service using a network.

The development of information processing technology, the expansion of a network, and the like in recent years have enabled various information processing to be implemented through cooperation with a server irrespective of the performance of a device operated by a user such as a personal computer, a portable terminal, or the like or a usage environment. A technology has been proposed which enables even a portable terminal or the like having a simple configuration to output advanced information, by for example separating the terminal operated by a user from an information processing device that performs information processing according to the user operation (see Japanese Patent Laid-Open No. 2012-65831, for example).

Another technology has been proposed which provides a mechanism for disclosing the details of information processing performed on an own device of a certain user and generated data to another user, by utilizing advantages of a server to which a plurality of terminals are connected (for example Japanese Patent Laid-Open No. 2012-38042). There has been an increasingly strong technological tendency to enable advanced information processing and the management of an enormous amount of data to be implemented irrespective of an environment in which a user is situated, by using various services provided by a server via a network as in cloud computing.

SUMMARY

As a technology enabling information of individual users and electronic data to be disclosed by using a server, as described above, becomes common, an amount of disclosed contents becomes enormous. As a result, it is becoming difficult to accurately access contents that seem valuable to a user from such an enormous amount of contents.

The present disclosure has been made in view of such problems. It is desirable to provide a technology that facilitates access to information desired by a user and which can provide various enjoyments to the user.

A mode of the present disclosure relates to a content providing method. The content providing method is a method for a content providing server to provide contents to client terminals via a network, the method including: obtaining play data indicating progress conditions of a computer game progressing according to user operation on the client terminals; evaluating game plays by each predetermined evaluation item on a basis of the play data; obtaining data of a moving image of a game play extracted according to an evaluation result; and distributing the data of the moving image to the client terminals via the network.

Another mode of the present disclosure relates to a content providing server. The content providing server includes: a play data receiving section obtaining play data indicating progress conditions of a computer game progressing according to user operation on client terminals; a play evaluating section evaluating game plays by each predetermined evaluation item on a basis of the play data; and a data distributing section obtaining data of a moving image of a game play extracted according to an evaluation result in the play evaluating section, and distributing the data of the moving image to the client terminals.

Yet another mode of the present disclosure relates to a content providing system. The content providing system includes: a client terminal including an input information transmitting section transmitting a request to view a moving image of a game play of a computer game to a server, and an output section outputting data of the moving image transmitted from the server according to the request to view the moving image; and the server including a play data receiving section obtaining play data indicating progress conditions of a computer game progressing according to user operation on each of a plurality of client terminals, a play evaluating section evaluating game plays by each predetermined evaluation item on a basis of the play data, and a data distributing section obtaining data of a moving image of a game play extracted according to an evaluation result in the play evaluating section, and transmitting the data of the moving image to the client terminal as a transmission source of the request to view the moving image.

It is to be noted that arbitrary combinations of the above-described constituent elements as well as modes realized by converting expressions of the present disclosure between a method, a device, a system, a computer program, and the like are also effective as modes of the present disclosure.

According to the present disclosure, contents can be provided via a network efficiently, and further enjoyment can be provided.

BRIEF DESCRIPTION OF THE DRAWINGS

FIG. 1 is a diagram showing a configuration of an information processing system in a present embodiment;

FIG. 2 is a diagram schematically showing patterns of information transmission performed between client terminals and a game environment providing server in the present embodiment;

FIG. 3 is a diagram showing an internal circuit configuration of a client terminal in the present embodiment;

FIG. 8 is a diagram showing an example of structure of play data generated for one game play in the streaming server in the present embodiment;

FIG. 9 is a diagram showing an example of evaluation criteria when the content providing server selects a super play in the present embodiment;

FIG. 10 is a diagram showing an example of data structure of filtering conditions retained by a filtering condition storage section of the content providing server in the present embodiment;

FIG. 11 is a diagram showing an example of data structure of user information retained by a user information storage section of the content providing server in the present embodiment;

FIG. 12 is a flowchart of a processing procedure for selecting a super play and outputting a live image of the super play to a client terminal as a watching entity in the present embodiment;

FIG. 13 is a flowchart of the processing procedure for selecting a super play and outputting a live image of the super play to the client terminal as a watching entity in the present embodiment;

FIG. 14 is a diagram showing an example of a screen displayed on a client terminal as a game entity to notify a user as a player that a game play is recognized as a super play in the present embodiment;

DETAILED DESCRIPTION OF THE PREFERRED EMBODIMENTS

Figure 4:
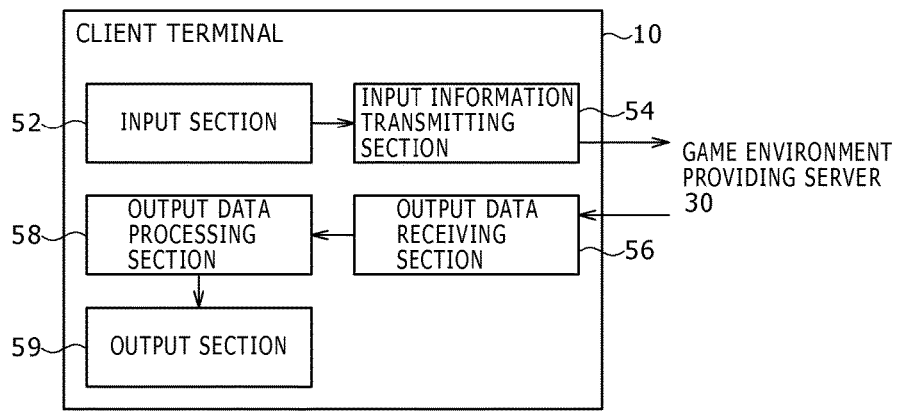
FIG. 4 is a diagram showing a functional configuration of the client terminal in the present embodiment.

A present embodiment is based on a flow of a server receiving an operation of a user on a client terminal via a network, performing processing requested by the user, and returning a result of the processing to the client terminal. As for details of the processing performed by the server, the processing performed by the server may be any information processing that outputs electronic data as a result, such as a computer game, moving image creation, program creation, audio data creation, a communication tool such as a chat, and the like. In addition, the output electronic data may be any of only an image, only audio, and a combination of an image and audio. Hereinafter, description will be made assuming a computer game, and supposing that the output data is the data of a game image. However, even in a case of simply "image display," audio may be output at the same time as required.

FIG. 1 shows a configuration of an information processing system in the present embodiment. Client terminals 10a, 10b, and 10c in the information processing system 1 are each configured so as to be connectable to an game environment providing server 30 via a network 3 to transmit and receive data to and from the game environment providing server 30. The game environment providing server 30 executes games specified according to requests from the client terminals 10a, 10b, and 10c, and transmits output data generated as a result of the execution to the client terminals 10a, 10b, and 10c. The client terminals 10a, 10b, and 10c and the game environment providing server 30 are connected to the network 3 by wire or by radio. Ordinary technologies can be applied to a method of connection between the client terminals 10a, 10b, and 10c and the game environment providing server 30 and procedures relating to the requests for the game processing and the transmission and reception of the output data.

The client terminals 10a, 10b, and 10c are devices operated by respective users. The client terminals 10a, 10b, and 10c transmit operations performed by the users as input information to the game environment providing server 30 to request processing according to the input information, and receive output data generated as a result of the game environment providing server 30 performing the processing and output the output data as an image and audio. The client terminals 10a, 10b, and 10c may be any of ordinary devices and terminals such as tablets, portable telephones, portable terminals, personal computers, and the like. Incidentally, the number of the client terminals 10a, 10b, and 10c and the game environment providing server 30 connected to the network 3 are not particularly limited. The client terminals 10a, 10b, and 10c may hereinafter be referred to collectively as a client terminal 10.

The game environment providing server 30 starts a game specified by the user on the client terminal 10, and makes the game progress according to operations of the user on the client terminal 10. Then the game environment providing server 30 successively transmits accordingly generated output data such as an image and audio or the like of the game to the client terminal 10.

The game environment providing server 30 further transmits same output data to a plurality of client terminals 10 to thereby enable a plurality of users to share the output data. For example, when the performed processing is a network game that can be joined by a plurality of users, the game environment providing server 30 successively receives information on the operations of the respective users from the plurality of client terminals 10, and reflects the information in the progress of the game. The game environment providing server 30 then transmits the generated output data of the game to all of the client terminals 10, whereby a battle type game can be realized.

The game environment providing server 30 further transmits the generated output data to the client terminals 10 of not only the users participating in the game but also a user who desires to simply watch the game and a user who desires to view the game afterward. This enables the game play of oneself and the others to be shared by the plurality of users regardless of time and place.

FIG. 2 schematically shows patterns of information transmission performed between the client terminal 10 and the game environment providing server 30 in the present embodiment. Suppose in this case that a user operating the client terminal 10a specifies a game that the user desires to play, whereby the application of the game is started in the game environment providing server 30. In this situation, a first pattern is a flow of the game environment providing server 30 receiving information on a user operation performed on an input device 5 of the client terminal 10a as a game execution request source (hereinafter referred to also as a "game entity"), and returning output data 7 generated according to the information to the client terminal 10a (S2).

As shown in FIG. 2, the output data 7 is formed by moving image data of a sequence of a plurality of image frames generated with the passage of time with a necessary update frequency such as a frame rate at a time of display or the like. The game environment providing server 30 performs the stream transfer of the image frames to the client terminal 10a in order in which the image frames are generated. Thus, a game image changing according to the operation of the user of the client terminal 10a is displayed on the client terminal 10a as the game entity at all times. Incidentally, play from a start to an end of one game will be referred to as a "game play" as one unit irrespective of the number of players. However, in some cases, units obtained by dividing the play from the start to the end with predetermined breaks may each be referred to as a "game play."

Next, a second pattern is a flow of the game environment providing server 30 transmitting the generated output data 7 to another client terminal 10b (hereinafter referred to also as a "watching entity") in parallel (S4). This enables the user of the client terminal 10b to simultaneously view, that is, "watch" the game being played by the user of the client terminal 10a.

A third pattern is a flow of the game environment providing server 30 storing the generated output data 7 for each game play in an internal storage device 9 (S6), and transmitting the generated output data 7 as needed according to a request from a certain client terminal 10c (S8). The transmission may be made in timing during the period of game execution, or in timing after the game is ended. The action by the user of the client terminal 10c at this time will be referred to as "moving image viewing" as distinguished from the already described "watching." The client terminal 10c will be referred to also as a "moving image viewing entity." In addition, as opposed to the moving image viewed in temporally subsequent timing, the image of the real-time output data transmitted to the client terminals 10a and 10b as the game entity and the watching entity will be referred to also as a "live image."

Incidentally, while FIG. 2 shows one client terminal 10a as a game entity, one client terminal 10b as a watching entity, and one client terminal 10c as a moving image viewing entity, a plurality of client terminals 10 in each position can occur at the same time. In addition, as will be described later, the position of the client terminal 10 changes according to a request of the user in for example a case where the user viewing a moving image becomes a game entity from the middle.

When the system shown in FIG. 2 is realized, not only the enjoyment of the game itself but also another enjoyment brought by relation with other users occurs. This effect becomes more noticeable as the number of participant users is increased. On the other hand, an enormous number of game plays make it difficult to select a watching object or a viewing object. That is, a very small part of the game plays which part are worth the attention of others are buried in a large number of other game plays, so that it becomes difficult to find a game play that one desires to view. In addition, providing an environment where a user disclosing a game play and a user viewing the game play can each make free access to the game play and providing accompanying service is a desirable form, but may lead to an increase in processing and a load on resources in the game environment providing server 30. As a result, a dilemma occurs in that a disadvantage can be caused to users in terms of stability of response speed and the like.

Accordingly, the present embodiment provides a technology for suitably matching a large number of game plays to users who desire to enjoy watching and viewing. Specifically, while the game environment providing server 30 is executing a requested game, various kinds of evaluation items representing the conditions of the game are recorded, and during the game or at an end of the game, the game play is evaluated on the basis of the recording. Then, a highly evaluated game play is extracted and set as a candidate for watching and moving image viewing, and the information is disclosed. A game play matching the request of a user can be extracted easily by preparing multilateral evaluation items.

In this manner, a game player may have the honor of the game play of the player being disclosed after being subjected to such evaluation, and thus the motivation of the game player for the game can be improved. In addition, as compared with a case where viewers are dispersed to a large number of mixed good and mediocre moving images, narrowing down disclosure objects tends to cause people to gather, and thus activates the place of disclosure. This can also be utilized to provide further service and promote the sale of the game and participation in the system. In addition, the increase in the load on the resources can be suppressed when the game environment providing server 30 itself manages game plays and viewing conditions of the game plays.

FIG. 3 shows an internal circuit configuration of the client terminal 10 in the present embodiment. The client terminal 10 includes a CPU (Central Processing Unit) 12, a GPU (Graphics Processing Unit) 14, and a main memory 16. The CPU 12 controls processing in constituent elements within the client terminal 10 and signal transmission on the basis of programs such as an operating system, an application, and the like. The GPU 14 performs image processing. The main memory 16 is formed by a RAM (Random Access Memory). The main memory 16 stores a program and data necessary for processing.

These parts are interconnected via a bus 20. The bus 20 is further connected with an input-output interface 18. The input-output interface 18 is connected with: a communicating section 22 including a peripheral device interface such as USB (Universal Serial Bus), IEEE1394, or the like and a network interface of a wired or wireless LAN; a storage section 24 such as a hard disk drive, a nonvolatile memory, and the like; an output section 26 for outputting image and audio data; an input section 28 for receiving input from the outside such as a user or the like; and a recording medium driving section 29 for driving a removable recording medium such as a magnetic disk, an optical disk, a semiconductor memory, or the like.

The CPU 12 controls the whole of the client terminal 10 by executing the operating system stored in the storage section 24. The CPU 12 also executes various kinds of programs read from the storage section 24 and the removable recording medium and loaded into the main memory 16 or downloaded via the communicating section 22. The GPU 14 has a function of a geometry engine and a function of a rendering processor. The GPU 14 performs rendering processing according to a rendering instruction from the CPU 12, and stores a display image in a frame buffer not shown in the figure. Then, the GPU 14 converts the display image stored in the frame buffer into a video signal, and outputs the video signal to the output section 26.

The input section 28 includes ordinary input devices such as a keyboard, a touch pad, buttons, a joystick, a microphone, a camera, and the like and a mechanism for obtaining input signals from the input devices. The output section 26 includes ordinary output devices such as a display for displaying an image, a speaker for outputting audio, and the like and a mechanism for sending out an output signal to the output devices.

The client terminal 10, the input devices included in the input section 28, and the display included in the output section 26 may have respective separate casings, and may be connected to each other by a wire cable. Alternatively, wireless connection may be established between the client terminal 10, the input devices included in the input section 28, and the display included in the output section 26 by using a Bluetooth (registered trademark) protocol, an IEEE802.11 protocol, or the like. Alternatively, a device having an integral casing may be formed within which the client terminal 10, the input devices included in the input section 28, and the display included in the output section 26 are connected to each other. For example, a portable game machine, a tablet terminal, an advanced portable telephone, or the like may be realized by disposing a display in a surface of a casing, and providing a touch pad on the front surface as an input device.

FIG. 4 shows a functional configuration of the client terminal 10. The client terminal 10 includes: an input section 52 for receiving user operation; an input information transmitting section 54 for transmitting the details of the received operation as input information to the game environment providing server 30; an output data receiving section 56 for receiving the output data transmitted from the game environment providing server 30; an output data processing section 58 for converting the transmitted output data into a form that can be output; and an output section 59 for outputting the output data.

Elements described as functional blocks performing various processing in FIG. 4 and FIGS. 5 to 7 to be described later can be configured by a CPU, a memory, and another LSI in terms of hardware, as already described, and is implemented by a program stored on a recording medium or in a storage device and loaded into a memory or the like in terms of software. Hence, it is to be understood by those skilled in the art that these functional blocks can be implemented in various forms by only hardware, only software, or combinations of hardware and software, and are not to be limited to any one of the forms.

The input section 52 is implemented by the input section 28 in FIG. 3. The input section 52 is input means for the user to perform operating input to the client terminal 10. When the client terminal 10 is a game entity, the input section 52 receives a specification of a game requested to be processed by the game environment providing server 30, operations for the game, and the like. When the client terminal 10 is a watching entity, the input section 52 receives a request to display a disclosure image showing a watching object candidate, an input for selecting a game play as a watching object, and the like.

When the client terminal 10 is a moving image viewing entity, the input section 52 receives a request to display a disclosure image showing a viewing object candidate and an input for retrieving or selecting a moving image as a viewing object. The input section 52 further receives a request to challenge the game play of a moving image being viewed. The input information transmitting section 54 is implemented by the CPU 12 and the communicating section 22 or the like. The input information transmitting section 54 establishes communication with the game environment providing server 30 by an ordinary method. Then, the input information transmitting section 54 generates a signal of input information indicating the details of operation on the input section 52 by the user, and transmits the signal to the game environment providing server 30.

The output data receiving section 56 is implemented by the communicating section 22 or the like. The output data receiving section 56 receives the output data transmitted from the game environment providing server 30. When the client terminal 10 is a game entity, the received output data is the data of an initial screen of a game or a live image changing according to user operations for the game. The output data is stream-transferred from the game environment providing server 30 during a game period. When the client terminal 10 is a watching entity, the received output data is the data of a disclosure image showing a watching object candidate, the data of a live image of a game play selected as a watching object, or the like. The latter is stream-transferred from the game environment providing server 30 during a game period.

When the client terminal 10 is a moving image viewing entity, the received output data is the data of a disclosure image showing a moving image of a viewing object candidate, the data of a moving image selected as a viewing object, or the like. The output data processing section 58 is implemented by the CPU 12 and the GPU 14 or the like. The output data processing section 58 decodes and decompresses the received output data as appropriate to convert the received output data into image and audio data that can be output. Alternatively, the output data processing section 58 constructs a display screen by interpreting information described in a markup language. The output section 59 is implemented by the output section 26 in FIG. 3. The output section 59 displays the image decompressed by the output data processing section 58 and outputs the audio, for example.

Figure 5:
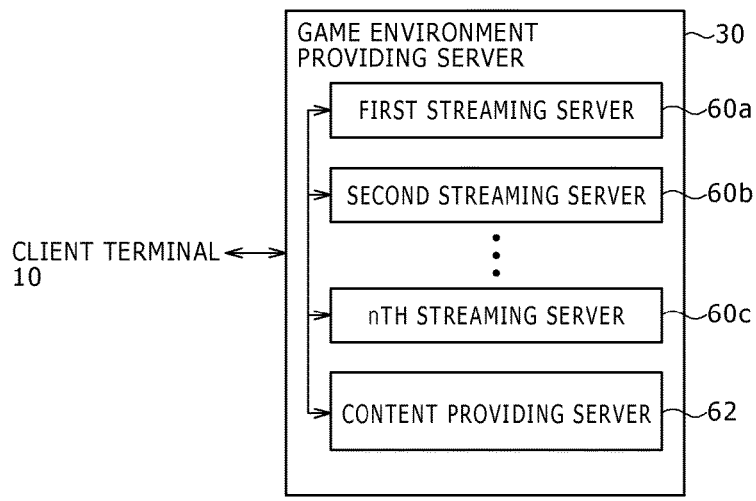
FIG. 5 is a diagram showing a configuration of the game environment providing server in the present embodiment.

FIG. 5 shows a configuration of the game environment providing server 30. Incidentally, the internal circuit configuration of each of servers forming the game environment providing server 30 may be similar to the internal circuit configuration of the client terminal 10 shown in FIG. 3. The game environment providing server 30 includes a first streaming server 60a, a second streaming server 60b, ..., an nth streaming server 60c, and a content providing server 62.

Each of the first streaming server 60a, the second streaming server 60b, ..., and the nth streaming server 60c starts a game application, and stream-transfers the data of a live image generated according to user operations on the corresponding client terminal 10 as a game entity to the client terminals 10 as the game entity and a watching entity. In addition, in a game execution period, each time a concrete value of a predetermined evaluation item is obtained, the first streaming server 60a, the second streaming server 60b, ..., and the nth streaming server 60c record the concrete value as evaluation item information.

Further, the first streaming server 60a, the second streaming server 60b, ..., and the nth streaming server 60c record save data according to a save operation performed by the user in the middle of the game or at a time of an end of the game, and record a snapshot periodically showing data conditions within a memory or a register. These pieces of information are to enable a challenge to the game play even from the middle of the game when a user viewing the moving image requests the challenge. Such information will hereinafter be referred to as "return information." In addition, the first streaming server 60a, the second streaming server 60b, ..., and the nth streaming server 60c may be referred to collectively as a streaming server 60.

The content providing server 62 assigns the processing of a game requested from a client terminal 10 as a game entity to one of the streaming servers 60. The content providing server 62 further evaluates the details of game plays being executed or ended in the streaming servers 60 on the basis of recorded evaluation item information, and extracts a game play to be set as a candidate for a watching object or a viewing object. The extracted game play as the watching object candidate and the moving image of the viewing object candidate are disclosed by respective disclosure images.

For example, in a role-playing game in which one advances through a virtual world while defeating enemies that appear, the content providing server 62 extracts a game play that has updated a shortest time record as a time taken to defeat an enemy appearing in a certain scene. When the game play is in progress, the content providing server 62 sets the game play as a watching object candidate. When the game is already ended, the content providing server 62 sets the moving image of the game play as a viewing object candidate. A plurality of evaluation items for the extraction are set and allowed to be used as search keys to enable a search. Thereby the user can easily find an object that the user desires to view from among candidates listed in the respective disclosure images.

Candidates are determined according to unified evaluation criteria on the basis of actual game conditions rather than superficial information such as the names of moving images, the number of times of reproduction, and the like. The selection of candidates and search results are thus highly reliable. In addition, evaluated points can be grasped in detail before actual watching or viewing. Therefore efficient access can be made. For example, pinpoint access can be made to a game play that conquers a scene well which scene one has difficulty in conquering. Further, because many game plays processed by the streaming servers 60 are evaluated automatically, even when a player himself/herself is not aware that the game play of the player is excellent or interesting, the game play can be brought up to the place of disclosure.

A game play extracted by such evaluation will be referred to as a "super play" regardless of whether the game is in progress or not. However, super plays are not limited to excellent plays, but may be unusual plays, interesting plays, or the like. A game creator or the like may set or reset evaluation items that interest users according to the details of the game after the release of the game.

Incidentally, in FIG. 1 and FIG. 5, the streaming servers 60 and the content providing server 62 are included in the game environment providing server 30. However, the streaming servers 60 and the content providing server 62 do not necessarily need to be at one place. For example, a game environment with better responsiveness can be realized by installing a large number of streaming servers 60 at various places around the world and selecting a streaming server 60 at a shortest distance from a client terminal 10 as a game entity to execute a game. Servers having a part or all of the functions of the content providing server 62 may also be installed at various places when the servers can share information with each other.

Figure 6:
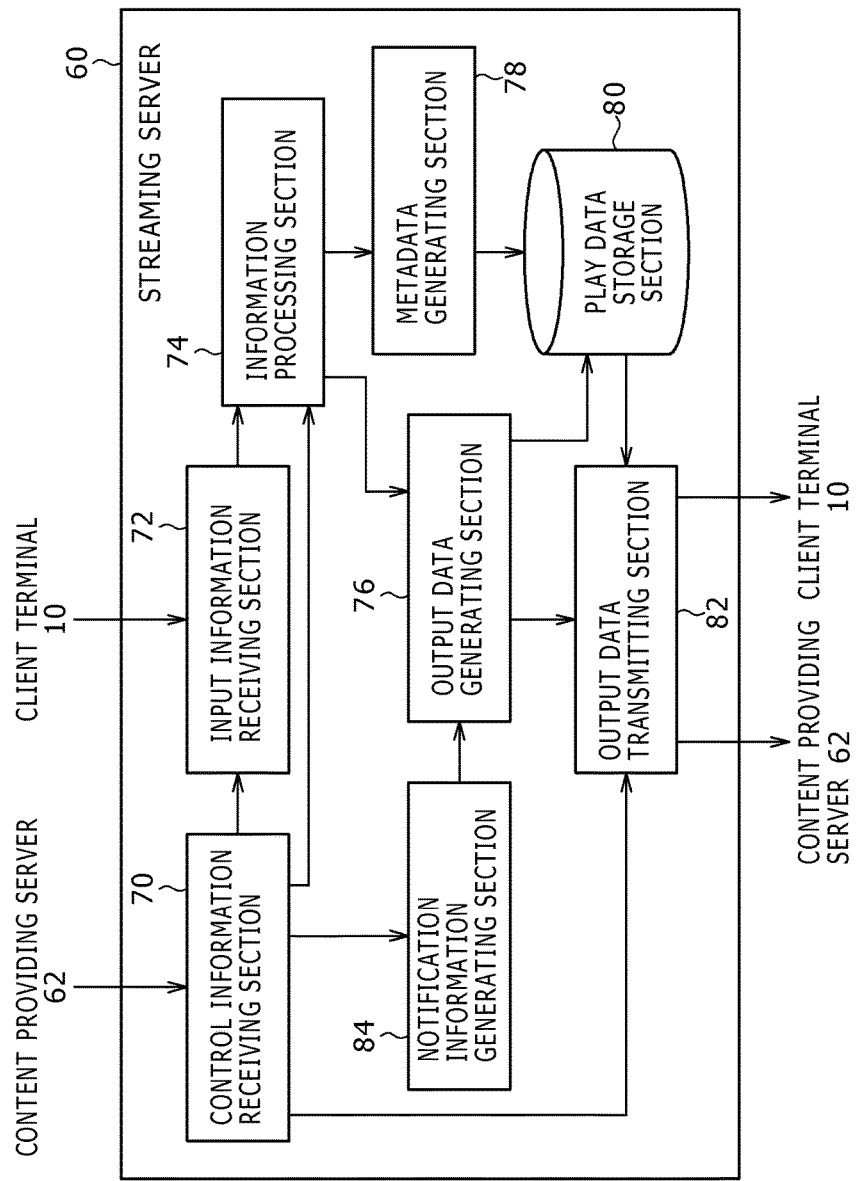
FIG. 6 is a diagram showing a functional configuration of a streaming server in the present embodiment.

FIG. 6 shows a functional configuration of a streaming server 60. The streaming server 60 includes: a control information receiving section 70 for receiving control information related to processing to be performed from the content providing server 62; an input information receiving section 72 for receiving information on user operation from the client terminal 10; an information processing section 74 for executing a requested game; a metadata generating section 78 for generating evaluation item information and return information as metadata; an output data generating section 76 for generating output data as a result of game execution; an output data transmitting section 82 for transmitting the output data to the client terminal 10; a play data storage section 80 for storing the metadata and the output data; and a notification information generating section 84 for including, in the output data, a notification that a game play is recognized as a super play.

The control information receiving section 70 is implemented by the communicating section 22 and the CPU 12 in FIG. 3 or the like. The control information receiving section 70 obtains information on a game to be executed from the content providing server 62, and further obtains the identifying information of the client terminal 10*a* as a game entity of the game as a transmission source of input information related to user operation and a transmission destination of the output data. In addition, when a game play that is in progress or ended is recognized as a super play, the control information receiving section 70 also obtains a notification to that effect.

The input information receiving section 72 is implemented by the communicating section 22 and the CPU 12 in FIG. 3 or the like. The input information receiving section 72 receives input information related to user operation, which input information is transmitted from the client terminal 10 as a game entity. The information processing section 74 is implemented by the CPU 12 and the main memory 16 or the like. The information processing section 74 starts and executes the application of the specified game. At this time, the information processing section 74 makes the game progress in real time according to the user operation information transmitted successively from one or a plurality of client terminals 10 as a game entity.

An ordinary emulation technology can be applied to a concrete protocol used for communication between the client terminal 10 and the streaming server 60, the format of input signals, and an interpreting method therefor, and the like, and thus description thereof will be omitted here. The metadata generating section 78 is implemented by the CPU 12 and the main memory 16 or the like. Each time the value of an evaluation item set in advance is obtained in the progress of the game in the information processing section 74, the metadata generating section 78 records the value of the evaluation item as evaluation item information. As for evaluation items to be recorded, evaluation items set for each game are stored in an internal memory or the like, and are referenced at a time of a start of the game or the like.

The metadata generating section 78 further records the above-described return information in the progress of the game in the information processing section 74. Basically, the return information is stored in the play data storage section 80 together with the data of the moving image of the corresponding game play, and transmitted to the content providing server 62. When a user viewing the moving image challenges the super play, the return information is used to start the game from timing desired by the user or set the same conditions as in the super play. This makes it possible to realize how excellent the game play recognized as a super play is, or to show that the play of the user himself/herself is better.

Incidentally, as with ordinary game plays, the game play challenging the super play (which game play will hereinafter be referred to as a "challenge play") is processed by the streaming server 60. At this time, the game is started in timing desired by the challenger by obtaining the return information from the content providing server 62 together with a processing request. The challenge play is also set as a watching object or an evaluation object. For example, whether the challenge play has won or lost may be determined by comparing the challenge play with the original super play, and when the challenge play has won, the super play may be replaced.

The evaluation item information and the return information generated by the metadata generating section 78 are stored as the metadata of the game play in the play data storage section 80. At this time, the evaluation item information and the return information are associated with the identifying information of the game play. The play data storage section 80 is implemented by the storage section 24 in FIG. 3 or the like.

The output data generating section 76 is implemented by the CPU 12 and the GPU 14 or the like. The output data generating section 76 generates output data by rendering a game image to be displayed as a result of processing by the information processing section 74 and adding audio such as BGM (background music) or the like to the game image. Moving image data is generated by generating the image frame to be displayed with a predetermined frequency, as described above.

The output data generating section 76 supplies the generated output data to the output data transmitting section 82, and compression-codes the output data in predetermined units and stores the compression-coded output data in the play data storage section 80. At this time, the output data is associated with the identifying information of the game play, whereby the evaluation item information and the return information generated by the metadata generating section 78 and the moving image data are associated with each other. Incidentally, instead of storing the moving image data, the user operation information received by the input information receiving section 72 may be stored, and the moving image data may be generated again in different timing.

For example, the moving image data may be generated by reproducing the game on the basis of the user operation information at a point in time that the game play in question is recognized as a super play and it is determined that the game play becomes a viewing object candidate. In this case, the information processing section 74 and the output data generating section 76 may generate the moving image data by reproducing the game and store the moving image data in the play data storage section 80, or the user operation information itself may be transmitted to the content providing server 62 so that the moving image data is generated within the content providing server 62.

The output data transmitting section 82 is formed by the CPU 12 and the communicating section 22 in FIG. 3 or the like. The output data transmitting section 82 transmits the generated real-time output data, that is, the data of a live image to the client terminal 10 as a game entity. In addition, when a notification that the game play in question is recognized as a super play is received from the content providing server 62, the output data transmitting section 82 also transmits the data of the same live image to the content providing server 62. Further, during the execution of the game or at a time of an end of the game, the output data transmitting section 82 reads evaluation item information from the play data storage section 80, and transmits the evaluation item information to the content providing server 62. The transmission may be made each time the value of an evaluation item is obtained, or may be made periodically.

When the game play is recognized as a super play, the output data transmitting section 82 further transmits the moving image data of the game play, which moving image data is stored in the play data storage section 80, to the content providing server 62. A transmission unit at this time does not necessarily need to be the whole of the game play. For example, when the game is divided into a plurality of stages, and the game play is recognized as a super play in a first stage, it suffices to transmit only the data of a moving image in the first stage. In this case, the moving image data can be transmitted even while the game is in progress. A dividing rule may be determined according to the details of the game. For example, division may be made into smaller units such that only a scene of a battle with a certain enemy is obtained as one moving image, or division may not be made.

When a game play during execution or at a time of an end of the execution is recognized as a super play, the notification information generating section 84 obtains information indicating that the game play is recognized as a super play from the content providing server 62 via the control information receiving section 70. Then, in order to notify the user as the player of the game play to that effect, the notification information generating section 84 synthesizes character information or the like for the notification with the live image. Together with this notification, whether or not the user intends to disclose the game play is confirmed, and the game play is disclosed only when the disclosure is permitted. Consideration is thus given to personal circumstances and privacy.

Figure 7:
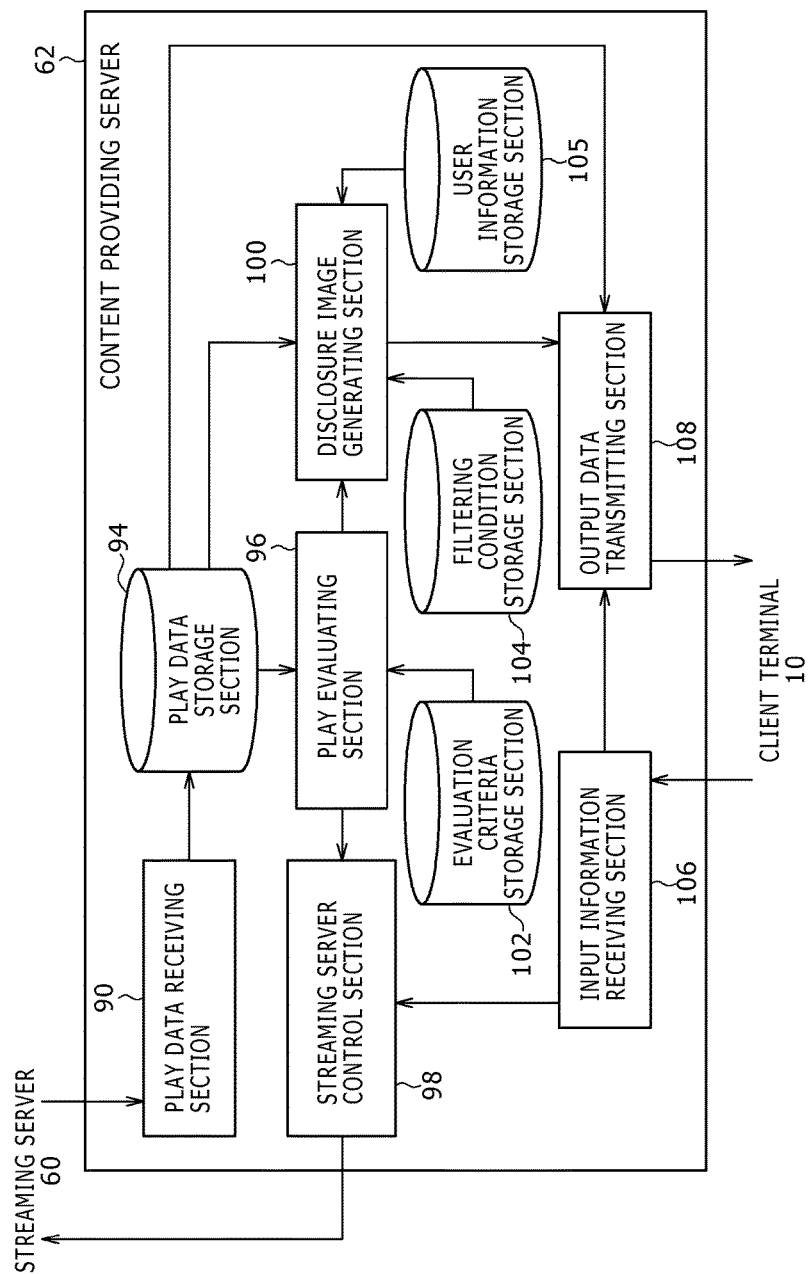
FIG. 7 is a diagram showing a functional configuration of a content providing server in the present embodiment.

FIG. 7 shows a functional configuration of the content providing server 62. The content providing server 62 includes: an input information receiving section 106 for receiving user operation information from the client terminal 10; a streaming server control section 98 for transmitting control information related to processing to be performed to the streaming server 60; a play data receiving section 90 for receiving the data of a game play, which data includes evaluation item information, the data of a live image, moving image data, and return information, from the streaming server 60; and a play data storage section 94 for storing the data of the game play.

The content providing server 62 further includes: a play evaluating section 96 for evaluating a game play on the basis of the transmitted evaluation item information; an evaluation criteria storage section 102 for storing evaluation criteria; a disclosure image generating section 100 for generating the data of disclosure images of watching object candidates and viewing object candidates; a filtering condition storage section 104 for storing filtering conditions for limiting game plays that can be watched or moving images that can be viewed according to the user; a user information storage section 105 for storing user information used for filtering; and an output data transmitting section 108 for transmitting the output data to the client terminal 10 as a watching entity or a moving image viewing entity.

The input information receiving section 106 is implemented by the communicating section 22 and the CPU 12 in FIG. 3 or the like. The input information receiving section 106 receives input information transmitted from the client terminal 10. Specifically, the input information receiving section 106 receives information requesting the execution of a game from the client terminal 10 as a game entity. The input information receiving section 106 receives the information of a request to transmit disclosure image data or a request to watch a selected game play from the client terminal 10 as a watching entity. The input information receiving section 106 receives the information of a request to transmit disclosure image data or a request to view a selected moving image from the client terminal 10 as a moving image viewing entity. Further, when a request to challenge the game play of a moving image being viewed is made, the input information receiving section 106 also receives the information of the request.

The streaming server control section 98 is implemented by the communicating section 22 and the CPU 12 or the like. The streaming server control section 98 notifies necessary information to the streaming server 60 and requests various kinds of processing according to a request from the client terminal 10 and a result of internally performed game play evaluation. Specifically, the streaming server control section 98 assigns the execution of a requested game to one of the streaming servers 60 on the basis of input information from the client terminal 10 as a game entity, which input information is received by the input information receiving section 106. Then, the streaming server control section 98 notifies the identifying information of the game and the identifying information of the client terminal 10 to the streaming server 60, and requests the streaming server 60 to execute the game.

In addition, when a game play is recognized as a super play, the streaming server control section 98 requests the streaming server 60 where the game play is being performed or was performed to transmit the data of a live image or a moving image. When obtaining information to an effect that a request for a challenge play is made from one of the client terminals 10, the streaming server control section 98 requests one of the streaming servers 60 to execute the game in question, and also requests the streaming server 60 to transmit the data of a live image of the game.

The play data receiving section 90 is implemented by the communicating section 22 and the CPU 12 or the like. The play data receiving section 90 receives various kinds of data of game plays, which data is transmitted from the streaming servers 60 according to a request from the streaming server control section 98. Specifically, the play data receiving section 90 receives the evaluation item information of a game play in progress or at a time of an end, the live image data and moving image data of a super play, return information, the live image of a challenge play, and the like. The play data receiving section 90 stores the received play data in the play data storage section 94. The play data storage section 94 is implemented by the storage section 24 in FIG. 3 or the like.

The play evaluating section 96 is implemented by the CPU 12 or the like. The play evaluating section 96 reads the evaluation item information of a game play in progress or at a time of an end, which evaluation item information is stored in the play data storage section 94, and evaluates the game play according to predetermined evaluation criteria. As for the evaluation criteria, evaluation criteria set by the game creator or the like in advance are stored in the evaluation criteria storage section 102. The evaluation criteria storage section 102 is implemented by the storage section 24 in FIG. 3 or the like.

When detecting a game play to be recognized as a super play as a result of the evaluation, the play evaluating section 96 notifies the streaming server control section 98 to that effect. The play evaluating section 96 thereby requests the streaming server 60 where the game play is being performed or was performed to transmit the data of a live image or a moving image via the streaming server control section 98. The play evaluating section 96 further notifies the identifying information of the game play that has become a super play to the disclosure image generating section 100.

The disclosure image generating section 100 is implemented by the CPU 12 and the GPU 14 or the like. The disclosure image generating section 100 generates, as disclosure images, an image for selecting a watching object from watching object candidates and an image for selecting a viewing object from viewing object candidates. The disclosure images are for example formed by making thumbnail display of the live images of the watching object candidates and the moving images of the viewing object candidates. However, the number of objects displayed as candidates does not necessarily need to be more than one.

When there is one object displayed as a candidate, a selection is made as to whether or not to watch/view the object. Alternatively, one live image or one moving image may be disclosed in a disclosure image.

In any case, when live images and moving images are disclosed to all users, even a user who has not purchased a game may know all about the game, or be able to try the game, which may pose a problem for the sale of the game application. In addition, even in a case of a user who has purchased a game, when the user has advanced to the middle of the game that has a plot such as a role-playing game or the like, the user may not desire to know the rest.

Accordingly, the disclosure image generating section 100 limits game plays included in a disclosure image according to the user. Filtering conditions and user information for this purpose are stored in the filtering condition storage section 104 and the user information storage section 105 in advance. The filtering condition storage section 104 and the user information storage section 105 are implemented by the storage section 24 in FIG. 3 or the like.

The disclosure image generating section 100 may generate not only the disclosure image showing the watching candidates and the disclosure image showing the viewing candidates but also a disclosure image for displaying a selected live image or a selected moving image. For example, the disclosure image generating section 100 may provide a frame to the live image or the moving image, or add character information to the live image or the moving image. In each case, the disclosure image generating section 100 may create a home page or the like by disposing the thumbnails of images of candidates, the live image, the moving image, or the like at an appropriate position within a screen according to a screen configuration described in a markup language.

The output data transmitting section 108 is implemented by the CPU 12 and the communicating section 22 or the like. The output data transmitting section 108 transmits output data to the client terminal 10. Specifically, the output data transmitting section 108 transmits one of the pieces of data of the disclosure images including the images of watching object candidates and viewing object candidates, a live image selected as a watching object, and a moving image selected as a viewing object according to input information from the client terminal 10. The data of the disclosure images is obtained from the disclosure image generating section 100. When the live image or the moving image is displayed without being manipulated, the output data transmitting section 108 reads the selected data from the play data storage section 94. For this purpose, the output data transmitting section 108 obtains information on the requested object on the basis of a user operation, for example the identifying information of the game play selected as a watching object or the like, from the input information receiving section 106.

FIG. 8 shows an example of structure of data generated for one game play in the streaming server 60, that is, play data. The play data 250 includes game play identifying information 252*a*, user identifying information 252*b*, client terminal identifying information 252*c*, evaluation item information 252*d*, return information 252*e*, and moving image data 252*f*. Incidentally, FIG. 8 shows one piece of play data formed by a contiguous sequence of these constituent elements, but is not intended to show that the constituent elements are stored in contiguous storage areas. The constituent elements may be stored in non-contiguous areas as long as the constituent elements are associated with each other via game play identifying information or the like, and the constituent elements may be individually set as an object to be transmitted and received.

The game play identifying information 252a is uniquely given to the game in question each time the game is started. It suffices for the user identifying information 252b and the client terminal identifying information 252c to be a login name and an IP address (Internet Protocol address) set in advance or the like. The user identifying information 252b and the client terminal identifying information 252c are obtained when the client terminal 10 is connected to the content providing server 62, logs in to the service, or performs communication, for example.

The evaluation item information 252d is information obtained by recording values determined according to the progress of the game in correspondence with evaluation items set for each game in advance. As illustrated in the upper right portion of FIG. 8, the evaluation items, such as the "conquering time" and "score" of "general," a "time taken to defeat" an "enemy A" and an "amount of damage," . . . , are set in accordance with the details of the game in units of a "first stage" and the like when it is preferable to divide the game into a plurality of stages. At a point in time that a value is determined for such an evaluation item, a numerical value such as "conquering time"="56 minutes and 35 seconds" or the like is recorded.

The evaluation items indicate conditions of the game. Concrete details of the evaluation items are not particularly limited as long as the evaluation items can be objects for evaluation. In addition, the recorded values do not necessarily need to be numerical values, but may be for example "win/lose," kinds of items, and the like that are generally expressed by characters. At a time of evaluation, the values of the respective evaluation items may be referenced singly, or may be combined with each other.

The return information 252e is information obtained by recording, at each point of the game in progress, data necessary to start the game again at a same point under same conditions. In an example shown in the lower right portion of FIG. 8, save data in each stage and snapshots at intervals of 30 seconds are recorded. However, the return information 252e is not limited to these pieces of data. Because there may be for example a case where it suffices to record only scores and changes in reached points, the return information is set appropriately according to the details of the game. The use of this information enables a challenge play to be started in the middle of the game under the same conditions as in the super play.

The moving image data 252f is the data of a moving image showing a game screen. The moving image data 252f is generated during the progress of the game or after an end of the game, compression-coded as appropriate, and stored in the play data storage section 80. As described above, the moving image data may be generated for each game play, or may be generated for each of a plurality of divided units. In the case of FIG. 8, the evaluation item information is obtained in stage units such as the "first stage" and the like, and therefore the moving image data may also be generated in the units. Alternatively, there may be for example moving image data of only a period of a fight with the "enemy A" in the "first stage." Hence, the moving image data 252f can include a plurality of pieces of moving image data. When a plurality of moving images are generated from one game play, each piece of moving image data is given identifying information to be managed.

FIG. 9 shows an example of evaluation criteria when the content providing server 62 selects a super play. Incidentally, FIG. 9 comprehensively shows evaluation criteria in general, and concrete numerical values and requirements serving as criteria for the selection of a super play are described for each game and for each evaluation item in the evaluation criteria storage section 102 of the content providing server 62. In an example of evaluation criteria 204, in a case where a game type is a "role-playing game," game plays identical to each other in terms of evaluation units, that is, a "character level," "retained weapons," a "visited town," a "type of defeated enemy," and the like are compared with each other, and game plays having highest levels in terms of evaluation items, that is, a "conquering time," the "number of times of defeating an enemy, a time taken to defeat an enemy, and an amount of damage," a "score and experience points," and the like are each selected as a super play.

That is, a super play is selected for each of combinations of evaluation units and evaluation items. For example, a game play that has made a highest score among game plays in conditions of staying at a certain town is selected as a super play. Alternatively, a game play that received a smallest amount of damage among game plays that defeated a certain type of enemy is selected as a super play. A super play may be thus selected by comparison with other game plays, or a game play that has a value better than a predetermined threshold value may be selected as a super play.

The same applies to other game types. In the case of an online game, however, there may be a large number of participants in the same game play. Thus, the participants may be compared with each other. For example, as shown in FIG. 9, a best participant who, for example, "first defeated an enemy among participants" is extracted, and the game play of the participant is recognized as a super play. Incidentally, the evaluation criteria shown in FIG. 9 are an example. Other evaluation units and evaluation items may be set according to the details of the game or the like, and combinations of evaluation units and evaluation items may be set freely. In addition, concrete numerical values and requirements serving as evaluation items and selection criteria are set to initial values by the game creator or the like before the release of the application of the game, and set or updated on the basis of actual game plays by users after the release. Because the content providing server 62 retains the evaluation criteria, the evaluation criteria can be updated easily, and evaluation that instantly reflects the conditions of game plays can be performed.

FIG. 10 shows an example of data structure of filtering conditions retained by the filtering condition storage section 104 of the content providing server 62. A filtering condition table 208 includes a filtering item column 210a and a condition value column 210b. The filtering condition table 208 associates items as filtering objects with condition values for permitting watching or viewing. The condition values may be common to each game, or may be set for each predetermined divided unit, depending on the filtering items. For example, in the case of a game play that provides play data shown in FIG. 8, the filtering condition values set for the game in question and the "first stage" are referenced for watching and moving image viewing of the "first stage."

In the example of the filtering condition table 208 shown in FIG. 10, the watching and the moving image viewing of the game play are limited to only the purchasers of the game application (second row), or limited to only users who have already cleared the same game or the same stage (third row). In addition, the watching and the moving image viewing of the game play are limited to only users who have made "friend registration" with the player of the game play in advance (eighth row). Incidentally, the filtering conditions shown in FIG. 10 are an example. In practice, some items may be made invalid, or other items may be added. Units for setting the condition values may be the same as units of generation of moving images, and may be set not only for each stage but also for each enemy.

FIG. 11 shows an example of data structure of user information retained by the user information storage section 105 of the content providing server 62. The user information table 212 includes an item column 214a and an actual value column 214b. Items described in the item column 214a are basically the same as in the filtering item column 210a in the filtering condition table 208 of FIG. 10. The actual values of each user are associated with these items.

The user information table 212 is prepared for each user and for each game. The actual value column 214b is updated as required each time the user purchases a game application or plays the game. Then, when a disclosure image of watching object candidates or viewing object candidates is generated, the filtering conditions and the user information of the client terminal 10 as a disclosure image request source are compared with each other, whereby only game plays that may be included in the disclosure image are extracted and included.

Alternatively, the disclosure image may be made common to users, and filtering may be performed at a point in time that a watching object or a viewing object is selected. At this time, a user who does not satisfy the filtering conditions set for the selected game play is notified to an effect that watching or viewing is not permitted. Further, reasons why watching or viewing is not permitted or what conditions are to be satisfied for watching or viewing may be notified.

Description will next be made of operation of the system realized by the configuration described thus far. FIG. 12 and FIG. 13 are a flowchart of a processing procedure for selecting a super play and outputting a live image of the super play to a client terminal 10 as a watching entity. First, referring to FIG. 12, the first streaming server 60a, the second streaming server 60b, and the like are executing games assigned to the first streaming server 60a, the second streaming server 60b, and the like, respectively, and are performing streaming transfer of the data of live images to client terminals as game entities (not shown) (S10 and S12).

Incidentally, suppose that at a point in time that a game application is started according to a request from a client terminal, identifying information is given to the game play in question, and added to live image data, moving image data, evaluation item information, and return information, whereby these pieces of data are thereafter managed by the identifying information within the system. In addition, suppose that the identifying information of the transmitting side and the receiving side is mutually grasped in processing of transmitting and receiving various kinds of data by using an existing communication protocol. Incidentally, FIG. 12 and FIG. 13 do not show data transmission and reception processing between the client terminals as game entities and the first streaming server 60a and the second streaming server 62b.

Each time the first streaming server 60a or the second streaming server 60b obtains a value for an evaluation item set in advance in parallel with the execution of the game, the first streaming server 60a or the second streaming server 60b generates the value as evaluation item information, and transmits the evaluation item information to the content providing server 62 (S14 and S16). The content providing server 62 evaluates a game play as needed on the basis of the transmitted evaluation item information (S18). The content providing server 62 then detects a game play that satisfies predetermined evaluation criteria as a super play (S20). The content providing server 62 notifies the streaming server as the transmission source of the evaluation item information (first streaming server 60a in FIG. 12) to that effect, and requests the streaming server as the transmission source of the evaluation item information to transmit live image data (S22).

Receiving the request, the first streaming server 60a notifies the user performing the game play that the game play is recognized as a super play, and inquires of the user whether or not to disclose the live image (S24). In actuality, an image of a message box showing the notified contents or a dialog box for the inquiry is included in the live image, or an instruction to display these boxes is embedded in the output data. When the user permits the disclosure, the first streaming server 60a starts to transmit the live image data to the content providing server 62 (S26).

Though not shown in the figure, when the user refuses the disclosure, the processing of step S26 is not performed. In either case, the first streaming server 60a continues transmitting the live image data to the client terminal as a game entity. The data of the live image transmitted to the content providing server 62 is included as a watching object candidate in a disclosure image. In this stage, the data of the live image may be stored as moving image data of a viewing object candidate in the play data storage section 94.

Meanwhile, when the user of the client terminal 10b that is not a game entity performs an operation of requesting to watch a game play, the client terminal 10b requests the content providing server 62 to transmit the data of a disclosure image of a watching object candidate (S28). Incidentally, in actuality, this processing may be started according to a request to access a page for watching on a home page related to the game, which page is provided by the game environment providing server 30.

The content providing server 62 generates a disclosure image showing the data of the live image which data is transmitted from the first streaming server 60a in a moving image thumbnail or the like, and transmits the data of the disclosure image to the client terminal 10b (S30). In this case, the disclosure image may be formed by only the live image of one game play, or may include the live images of other super plays. In addition, when there is no super play during the progress of the game, the disclosure image may include a description to that effect in place of the thumbnail image.

In addition, the disclosure image is not limited to a moving image thumbnail, but may be a still image thumbnail, only character information, or the like. In generating the disclosure image, user information read from the user information storage section 105 on the basis of the user identifying information of the client terminal 10b as the request source is compared with the filtering conditions read from the filtering condition storage section 104 to select display objects for each user. The client terminal 10b displays the disclosure image of the transmitted data, and when the user performs a watching starting operation by selecting the game play, for example, the client terminal 10b makes a request to the content providing server 62 for a start of watching of the game play (S32).

Next, referring to FIG. 13, the content providing server 62 starts to transmit the live image data of the requested game play to the client terminal 10b (S34). The client terminal 10b thereby starts to display the live image (S36). Incidentally, when watching objects are narrowed down to one, the processing of S32 and S34 may be omitted. In this case, watching is made possible at a point in time that the user accesses the page for watching on the home page, for example. Alternatively, a plurality of game plays may be allowed to be watched at the same time.

Meanwhile, the content providing server 62 continues evaluating each game play using the evaluation item information collected from each streaming server 60. At this time, when the content providing server 62 detects a game play better than the game play previously recognized as a super play under the same evaluation item (S38), the content providing server 62 starts processing of super play replacement. Specifically, the content providing server 62 requests the streaming server on which the newly detected super play is being performed (second streaming server 60b in FIG. 13) to transmit live image data (S40).

Receiving the request, the second streaming server 60b notifies the user performing the game play that the game play is recognized as a super play, and inquires of the user whether or not to disclose the live image (S42). This processing is similar to S24 in FIG. 12. When the user permits the disclosure, the second streaming server 60b starts to transmit the live image data to the content providing server 62 (S44). As in FIG. 12, when the user refuses the disclosure, the processing of step S44 is not performed. In this case, the original super play may remain a super play as it is.

At a point in time that the disclosure of the newly recognized super play is permitted, the content providing server 62 transmits a notification that the super play is replaced to the first streaming server 60a on which the original super play is being performed and the client terminal 10b as a watching entity on which the original super play is being watched (S46). The notification to the client terminal 10b is realized by for example including a message box image showing information to that effect in the live image whose data is being transmitted. Receiving the notification, the first streaming server 60a notifies the user playing the game that the recognition of the super play is cancelled and that the game play is excluded from objects of disclosure, by a message box or the like (S48).

Meanwhile, the client terminal 10b notifies the user that the super play is replaced, by displaying a message box transmitted from the content providing server 62, for example (S50). At this time, the content providing server 62 also replaces the watching object candidate included in the disclosure image. Then, the content providing server 62 changes the live image of the watching object which live image is transmitted to the client terminal 10b to the live image of the newly recognized super play (S52). However, when the user of the client terminal 10b desires to continue watching the previous super play, for example, the change does not need to be made until the game play is ended or the user performs a watching ending operation.

When the content providing server 62 has changed all of the object included in the disclosure image and the object transmitted to the client terminal 10b as a watching entity, the content providing server 62 notifies the first streaming server 60a on which the previous super play is being performed to that effect. The first streaming server 60a accordingly stops transmitting the live image data to the content providing server 62 (S54). Meanwhile, the client terminal 10b starts to display the live image of the new super play (S56).

By continuing performing the processing procedure shown in FIG. 12 and FIG. 13 for the game plays being performed, the live image disclosed as a super play is based on latest information at all times. This enables a player to challenge the game with a new objective different from conquering or winning the game itself, that is, an objective of the game play of the player being recognized as a super play and watched by others. A range of enjoyment is therefore widened greatly. In addition, a user who desires to watch an excellent game play or an interesting game play can find a desired game play efficiently from among an enormous number of game plays.

FIG. 14 shows an example of a screen displayed on the client terminal 10 as a game entity to notify the user as a player that the game play is recognized as a super play in S24 in FIG. 12 or S42 in FIG. 13. The super play selected as a watching object is a game in progress. Thus, the notification is superimposed on the game screen, or displayed in a region different from the display region of the game screen. FIG. 14 represents the former case. A screen 200a first displays a message box 202a notifying that the game play of the player is recognized as a super play on the game screen. A screen 200b next displays a dialog box 202b inquiring about whether or not to disclose the game play. The user performs a confirming operation by for example moving a cursor onto a character string "Yes" or "No" according to whether or not to permit the disclosure.

Thus notifying the player that the game play of the player is recognized as a super play enables the player to realize that the play of the player is worth evaluation. Generally, the player has few opportunities to have such a realization, and thus does not tend to have an idea of disclosing or boasting of the play of the player. As a result, even an excellent game play is not likely to receive the attention of others. The present embodiment prevents the presence of the super play from being buried, by detecting a super play with high accuracy, and can give the player an aspiration or an ambition by making the player also realize that the play of the player is worth evaluation.

Figure 15:
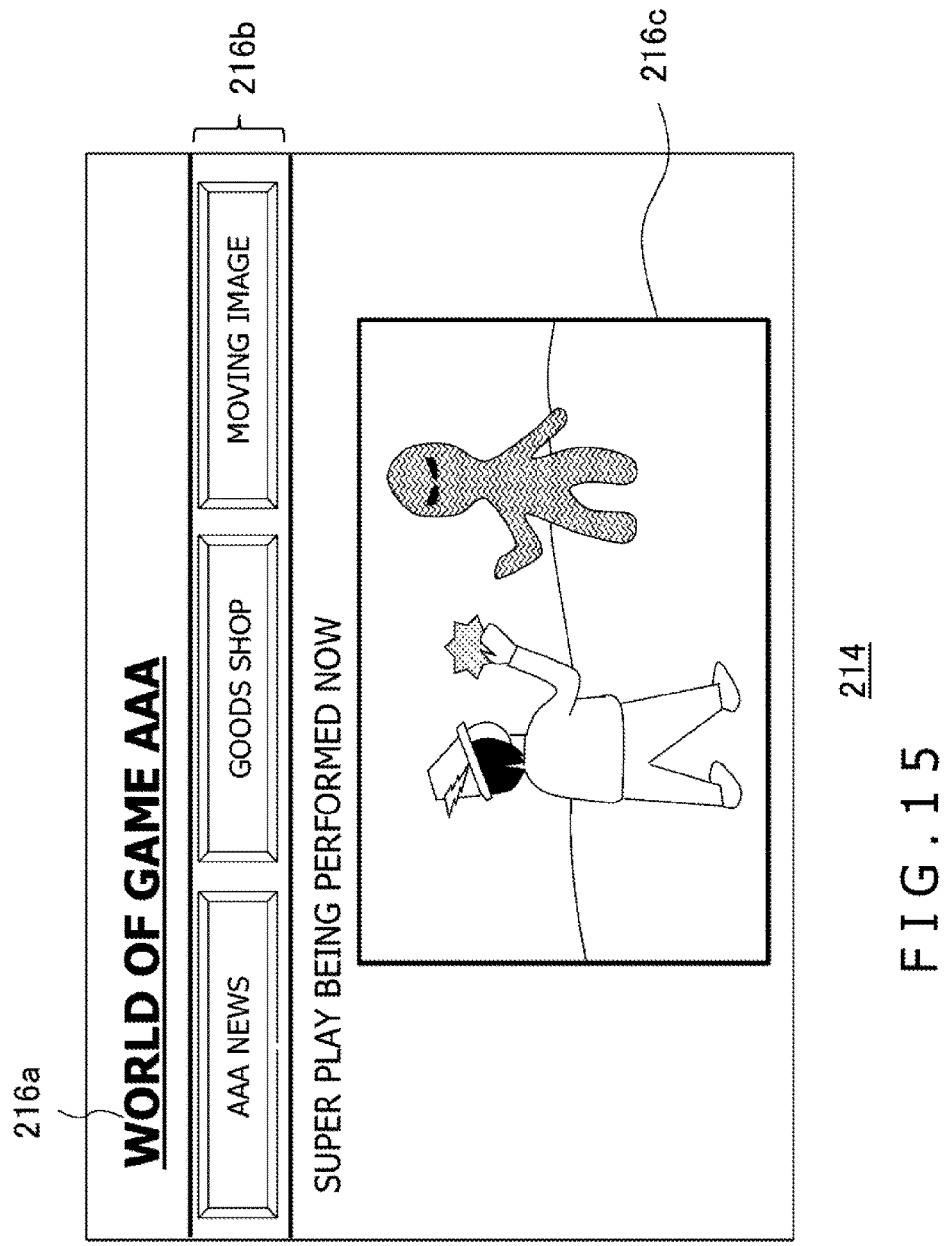
FIG. 15 is a diagram showing an example of a screen of a disclosure image displayed on a client terminal as a watching entity in the present embodiment.

FIG. 15 shows an example of a screen of the disclosure image transmitted from the content providing server 62 in S30 in FIG. 12 and displayed on the client terminal 10b as a watching entity. In the present example, the disclosure image is provided by showing a watching object candidate on the home page related to the game. The disclosure image 214 includes a title 216a of the home page, a GUI (Graphical User Interface) region 216b for selecting a link to a news page related to the game, a page selling related goods, or a page for viewing a moving image, and a region 216c for displaying the live image of the super play.

In the present example, the live image of the watching object is directly displayed in the disclosure image 214 by narrowing down disclosed super plays to one. However, as described above, the thumbnail images of a plurality of super plays may be first displayed as a disclosure image, and the user may make a selection from among the thumbnail images, whereby a live image such as the image 214 or the like may be displayed. Incidentally, due to filtering, the live image or the thumbnails displayed in the disclosure image 214 may differ according to the user.

Figure 16:
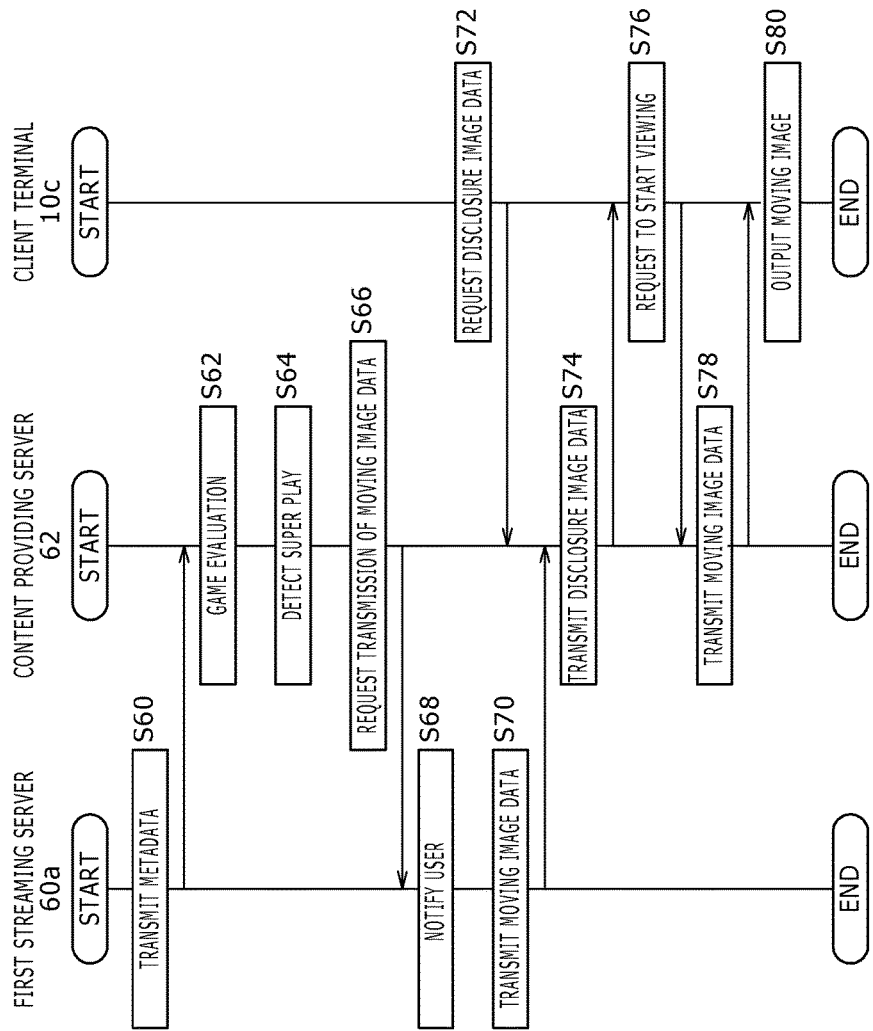
FIG. 16 is a flowchart of a processing procedure for selecting a super play and outputting a moving image of the super play to a client terminal as a moving image viewing entity in the present embodiment.

FIG. 16 is a flowchart of a processing procedure for selecting a super play and outputting the moving image of the super play to a client terminal 10 as a moving image entity. Incidentally, this processing may be performed independently of the processing for watching a game play which processing is shown in FIGS. 12 and 13, or this processing may be compatible with the processing for watching a game play which processing is shown in FIGS. 12 and 13. In the latter case, a few pieces of processing shown in FIG. 16 can be omitted. First, each streaming server such as the first streaming server 60a and the like transmits the evaluation item information of a game play to the content providing server 62 in predetermined timing such as a point in time that the game play is ended or the like (S60). Predetermined timing other than the point in time of the end of the game is for example a point in time that an end point of a divided unit generated as a moving image as described above is reached, or a time when each stage corresponding to a chapter of a story in the case of a role-playing game is cleared.

The content providing server 62 evaluates the game plays on the basis of the transmitted evaluation item information (S62). The content providing server 62 then detects a game play that satisfies predetermined evaluation criteria as a super play (S64). The content providing server 62 notifies the streaming server as the transmission source of the evaluation item information of the game play (first streaming server 60a in FIG. 16) to that effect, and requests the streaming server as the transmission source of the evaluation item information of the game play to transmit moving image data (S66). Incidentally, as described above, in place of the processing of S66, the moving image data may be generated within the content providing server 62 by obtaining the log information of user operation during the game play and reproducing the game play.

In addition, as shown in FIGS. 12 and 13, the processing from S60 to S64 can be omitted when game play evaluation is performed during game execution. Further, when the live image data is already obtained as a watching object or a watching object candidate during the game play, the content providing server 62 may store the live image data as moving image data in advance, as described above. In this case, the processing of S66 and the processing of S68 and S70 to be described later can also be omitted.

Receiving the request in S66, the first streaming server 60a notifies the user performing the game play that the game play is recognized as a super play, and inquires of the user whether or not to disclose the moving image (S68). A display screen at this time is similar to that shown in FIG. 14. When the user permits the disclosure, the first streaming server 60a transmits the moving image data of the game play to the content providing server 62 (S70). The transmitted moving image data is stored in the play data storage section 94. At this time, reasons why the play data is selected as a super play and the evaluation item information transmitted in S60 are associated with the moving image data.

This makes it possible to improve the efficiency of display of characteristics of the moving image in the disclosure image, use of evaluation items for search keys, comparison display with a challenge play, and the like. Incidentally, though not shown in the figure, the processing of S70 is not performed when the user refuses the disclosure. These pieces of processing are similar to S24 and S26 in FIG. 12, but are different from S24 and S26 in FIG. 12 in that data transmission from the first streaming server 60a to the content providing server 62 is not continuous because the transmitted object is moving image data.

Meanwhile, when the user of the client terminal 10c that is not a game entity performs an operation of requesting to view a moving image, the client terminal 10c requests the content providing server 62 to transmit the data of a disclosure image of a viewing object candidate (S72). As in watching, this processing may be started according to a request to access a page for moving image viewing on the home page related to the game. For example, this processing is started when the user operates the GUI showing the link to the page for moving image viewing in the GUI region 216b of the home page shown in FIG. 15.

The content providing server 62 generates a disclosure image showing the moving image the data of which is transmitted from the first streaming server 60a or the like in a thumbnail or the like, and transmits the data of the disclosure image to the client terminal 10c (S74). As in the case of the disclosure image of the watching object candidate, the disclosure image may be formed by only the thumbnail of the moving image of one game play, or may include the thumbnails of the moving images of other super plays. In addition, the disclosure image is not limited to a moving image thumbnail, but may be a still image thumbnail, only character information, or the like. In addition, user information read from the user information storage section 105 on the basis of the user identifying information of the client terminal 10c as the request source is compared with the filtering conditions read from the filtering condition storage section 104 to select display objects for each user.

The client terminal 10c displays the disclosure image of the transmitted data, and when the user performs a viewing starting operation by selecting the moving image, for example, the client terminal 10c makes a request to the content providing server 62 for a start of viewing of the selected moving image (S76). The content providing server 62 transmits the data of the requested moving image to the client terminal 10c (S78). The selected moving image is thereby displayed on the client terminal 10c (S80).

Figure 17:
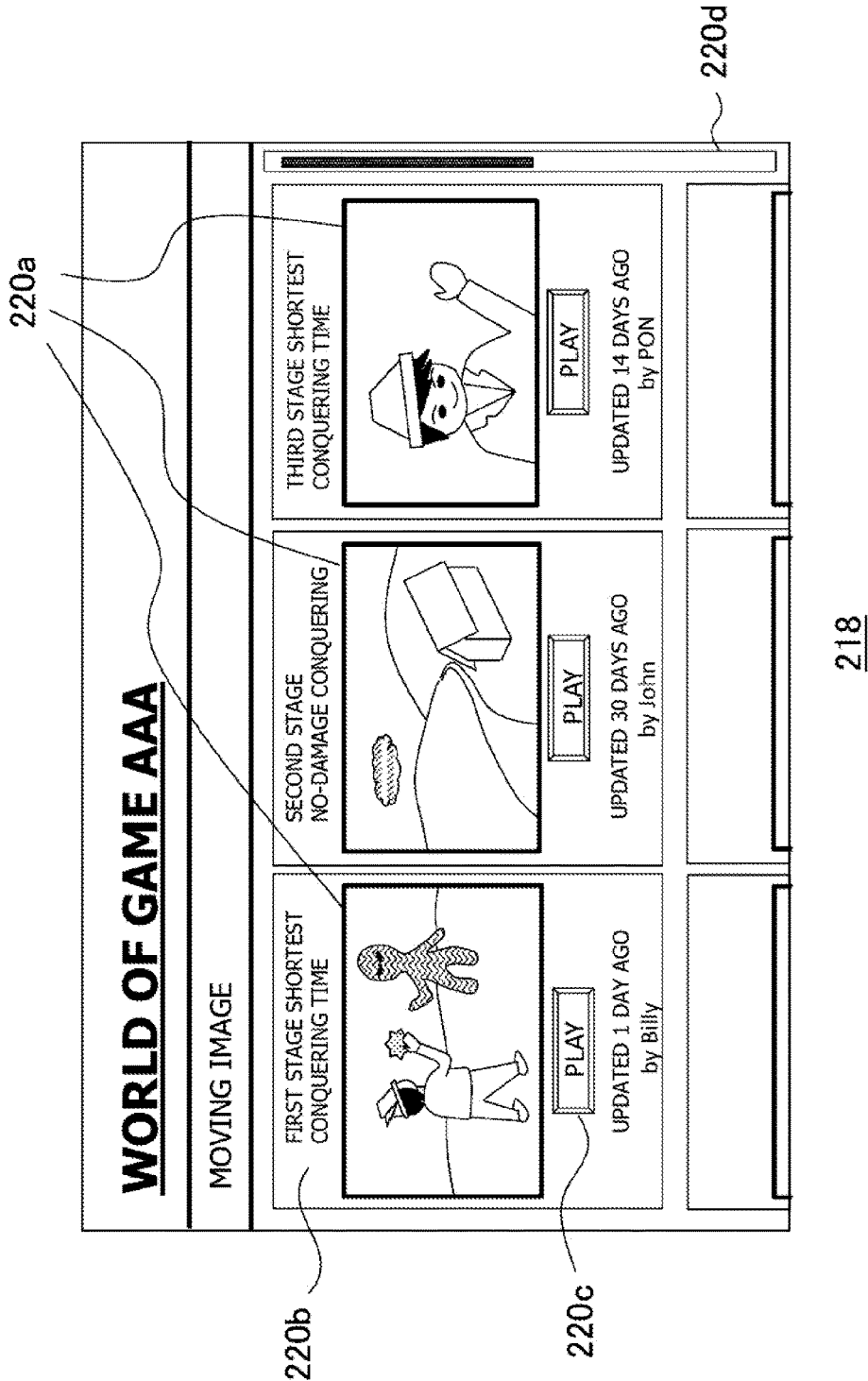
FIG. 17 is a diagram showing an example of a screen of a disclosure image displayed on the client terminal as a moving image viewing entity in the present embodiment.

FIG. 17 shows an example of a screen of the disclosure image transmitted from the content providing server 62 in S74 in FIG. 16 and displayed on the client terminal 10c as a moving image viewing entity. In the present example, the disclosure image is provided by showing viewing object candidates on the page for moving image viewing within the home page related to the game. The disclosure image 218 displays, for each moving image, a set of a thumbnail image 220a, character information 220b showing the characteristics of the moving image, and a GUI 220c for selecting the moving image as a viewing object. The characteristics of the moving image represent reasons that the moving image is recognized as a super play, and correspond to a combination of an evaluation unit and an evaluation item in the case of the evaluation criteria shown in FIG. 9.

In addition, when the viewing object candidates cannot be displayed at a time, a scroll bar 220d is displayed, for example, to allow the user to scroll the screen. The user refers to the thumbnail images 220a and the character information 220b that are displayed, selects a moving image that the user desires to view, and makes a request to reproduce the moving image by operating the corresponding GUI 220c. As in the case of watching, when a new super play occurs under the same evaluation item, the moving image included in the disclosure image is also replaced. This enables the user who desires to view the moving image to be provided with latest information at all times.

In addition, the moving images included in the disclosure image are selected for each of combinations of the evaluation units and the evaluation items set as the evaluation criteria as described above, for example, on the basis of multilateral evaluation, and the characteristics of the moving images are clear before the moving images are actually viewed. Accordingly, a function of allowing the user to search for a moving image may be added to the disclosure image 218 of FIG. 17. When a search key corresponding to an evaluation item such as a stage number, the name of an enemy, a shortest conquering time, a minimum amount of damage, or the like is allowed to be selected as a search condition at this time, the user can find a moving image that matches the conditions or request of the user himself/herself efficiently.

Figure 18:
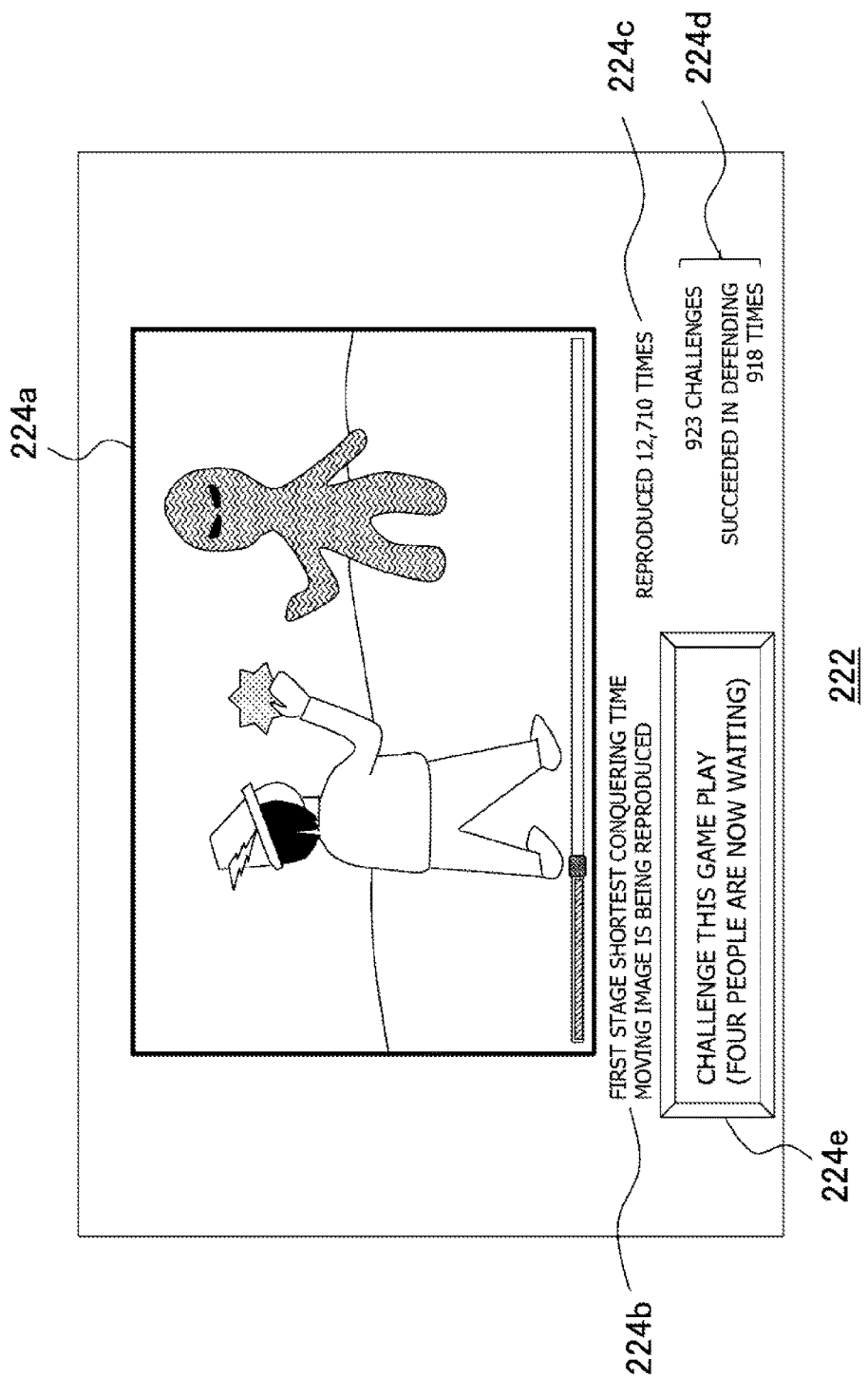
FIG. 18 is a diagram showing an example of a moving image viewing screen displayed on the client terminal as a moving image viewing entity in the present embodiment.

FIG. 18 shows an example of a moving image viewing screen displayed on the client terminal 10c as a moving image viewing entity in S80 in FIG. 16. This screen is displayed according to an operation by the user on the GUI 220c corresponding to a certain moving image in the disclosure image shown in FIG. 17, for example. The moving image viewing screen 222 displays a moving image 224a as a viewing object, character information 224b showing the characteristics of the moving image, a number of times of reproduction 224c, a number of times that the game play of the moving image has been challenged and a number of times of successful defending out of the number of times that the game play of the moving image has been challenged 224d. The display of the number of times of challenge and the number of times of successful defending 224d in addition to the number of times of reproduction 224c enables a degree of attention to the moving image and a degree to which the game play excels to be grasped at a glance.

The moving image viewing screen 222 further displays a GUI 224e for requesting a challenge to the game play of the moving image. In the example of FIG. 18, a GUI in the form of a button including a character string "challenge this game play" is displayed. Further, the number of users on a waiting list for a challenge play at that point in time is displayed. In the example of FIG. 18, a character string "four people are now waiting" is displayed.

When a state of waiting on a waiting list for a challenge play is made to occur readily by for example providing an appropriate upper limit to the number of parallel executions of challenge plays challenging the game play of one moving image, a degree of attention to the moving image can be expressed also by the number of people on the waiting list. It is expected that the higher the degree of attention to the moving image, the larger the number of viewers, challengers, and challenge play watchers as a result of the moving image arousing further interest. This enables a large number of users to share enjoyment centering around the game play of one moving image. In addition, when the number of challenge plays to be processed simultaneously is limited, an increase in processing cost of the streaming servers 60 that execute the challenge plays can be prevented.

When there are a large number of people on the waiting list, a user who desires a challenge play may perform a challenge play at some other time, which also leads to the temporal spread of the processing cost. However, in order to prevent one user from monopolizing the challenge play environment, a time limit may be set to one challenge play, or the number of times of challenge per day may be limited.

Figure 19:
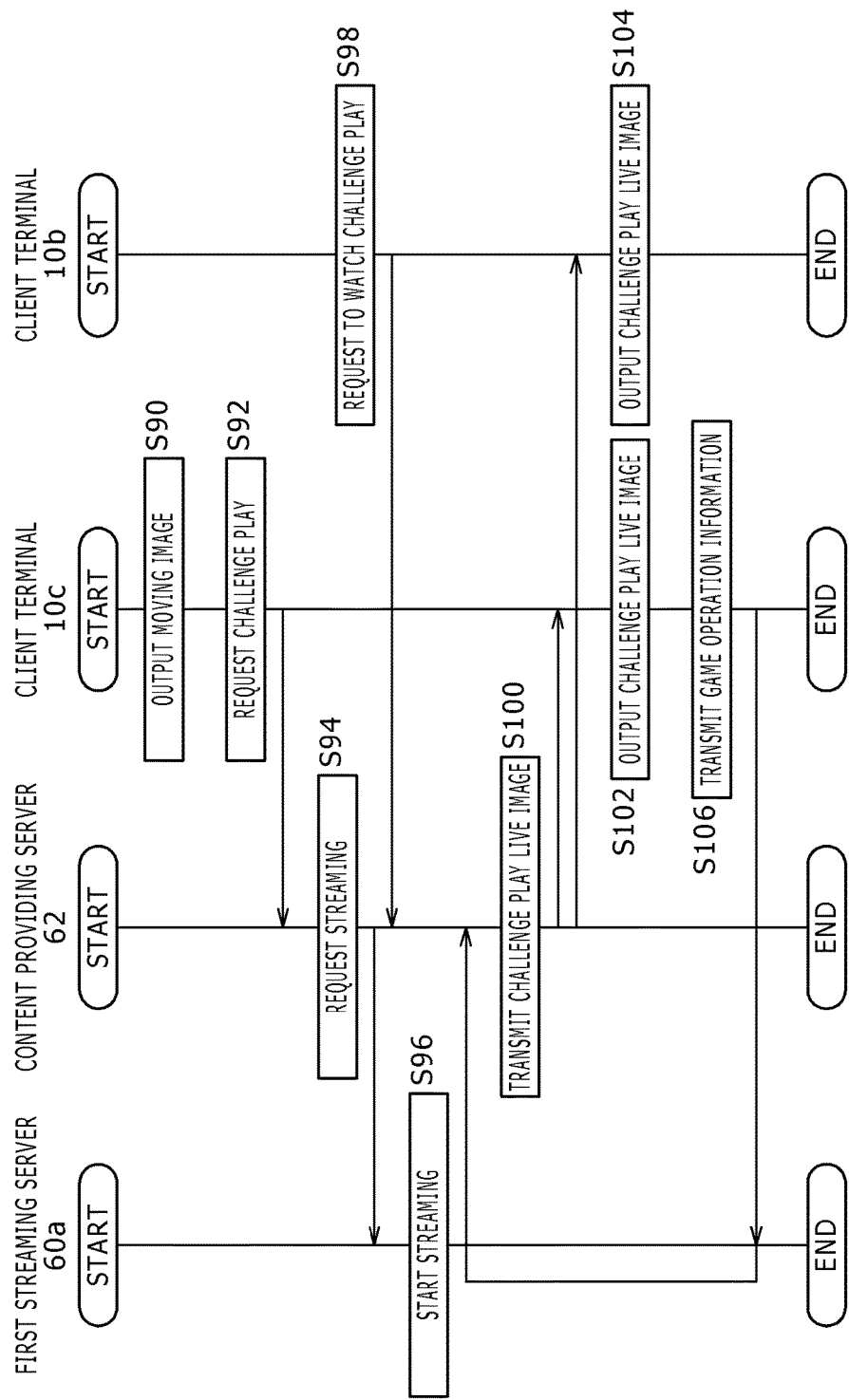
FIG. 19 is a flowchart of a processing procedure when the user of the client terminal as a viewing entity challenges the game play of a moving image that the user is viewing in the present embodiment.

FIG. 19 is a flowchart of a processing procedure when the user of the client terminal 10c as a viewing entity challenges the game play of a moving image that the user is viewing. First, as a result of the processing procedure shown in FIG. 16, a moving image selected as a viewing object is output to the client terminal 10c (S90). When the user performs an input indicating a challenge to the game play in this state, the client terminal 10c transmits a request to that effect to the content providing server 62 (S92). For example, the request for the challenge play is received by detecting an operation by the user on the GUI 224e on the moving image viewing screen of FIG. 18.

The content providing server 62 then requests one of the streaming servers (first streaming server 60a in FIG. 19) to execute the game in question and perform stream transfer of a result of the execution (S94). Incidentally, when the number of parallel executions of challenge plays exceeds an upper limit, the client terminal 10c is added to a queue. Specifically, a queue is prepared for each moving image in a memory within the content providing server 62, and the identifying information of the client terminal 10c is stored in the queue. When the number of parallel executions has decreased, the identifying information of the client terminal 10c is read by an FIFO (First-In First-Out) system, and the execution of the game is started.

On the other hand, when the first streaming server 60a is requested to perform stream transfer in S94, the identifying information of the game, the identifying information of a divided unit corresponding to the moving image, and return information added to the moving image data are included in a request signal. However, the return information does not need to be included when the challenge is made from the beginning of the game, or when the challenge is made from the beginning of a divided unit that is not affected by a result in a previous divided unit or the like, for example.

When the challenge is made from the beginning of a moving image generated for each divided unit or when the challenge is made from a scene corresponding to the timing of the user requesting the challenge play while the moving image is reproduced, the processing of the game is started on the basis of the return information. When the challenge is made from the middle of the moving image, the number of an image frame displayed at a point in time that the challenge play requesting operation is performed, an elapsed time from a start of the reproduction, or the like is obtained. On the basis of the return information recorded immediately before or immediately after that timing during the original game play, the game is started in that timing. For this purpose, the content providing server 62 extracts the return information corresponding to the challenge play requesting operation from the return information added to the moving image data for which the challenge play is requested, and includes the return information in the streaming request signal transmitted in S94.

The first streaming server 60a starts the application of the specified game, and starts processing in the specified timing. The first streaming server 60a then starts the stream transfer to the content providing server 62 by sequentially generating and outputting the output data (S96). The use of the return information in the case of starting in the middle of the game enables a challenge to be made under the same conditions as the game play recognized as a super play.

However, the game does not necessarily have to be started under the entirely same conditions. For example, by making a degree of difficulty variable so that the user can set an even higher degree of difficulty than that of the super play or a lower degree of difficulty than that of the super play, the user himself/herself may be able to objectively determine the degree of skill of the user himself/herself as compared with the super play. Alternatively, only the scene where the game is started is made uniform, and the other conditions may be set according to the conditions when the user as a challenger played the same game in the past. In this case, the content providing server 62 stores the return information of the game plays of all users, and extracts the return information of the game play performed in the past by the present challenger from the identifying information of the client terminal 10c that requests the challenge play, the identifying information of the user of the client terminal 10c, or the like.

When the first streaming server 60a is requested to execute the game, the thus extracted return information of the challenger himself/herself is included. This enables the game to be started in the same scene as the moving image disclosed as the super play with the game conditions thus far of the challenger himself/herself reflected. A part of the return information of the super play and a part of the return information of the challenger may be combined with each other into one piece of return information, and the game may be started on the basis of the one piece of return information. For example, the score and the game conditions of the super play may be reflected, and a character model and the costume of the character model that are prepared by the challenger may be used as a character model appearing in the game and the costume of the character model. This enables a challenge to be made with a character to which the challenger has an attachment.

The variations may be able to be selected by the user as a challenger from among things prepared by the game creator, or may be fixed for each game. In the former case, a variation set by the user when the user played the game for the first time may be recorded in the content providing server 62 or the client terminal 10c, and read as required, or an inquiry may be made to the user by a dialog box or the like in response to the request for the challenge play.

Meanwhile, when the user of the client terminal 10b different from the client terminal 10c of the challenger performs an operation of making a request for watching the challenge play, the client terminal 10b makes a request to that effect to the content providing server 62 (S98). Incidentally, in the processing of S98, as with the watching request shown in FIG. 12, the data of a disclosure image showing watching object candidates may be requested first, and a request for watching a challenge play selected by the user from the disclosure image may be made.

The content providing server 62 generates the data of a live image of the challenge play using the output data transmitted from the first streaming server 60a, and performs the stream transfer of the data of the live image of the challenge play to the client terminal 10c of the challenger and the client terminal 10b as a watching entity (S100). The live image of the challenge play is thereby output on the client terminal 10c and client terminal 10b (S102 and S104).

Each time a user operation for the game is performed on the client terminal 10c of the challenger, the client terminal 10c of the challenger transmits the input information of the user operation to the first streaming server 60a (S106). The first streaming server 60a continues to transmit the output data to the content providing server 62 while making the game progress according to the input information, and the content providing server 62 updates the live image (S100). Thereby the live image on the client terminal 10c and the client terminal 10b is also updated (S102 and S104).

Figure 20:
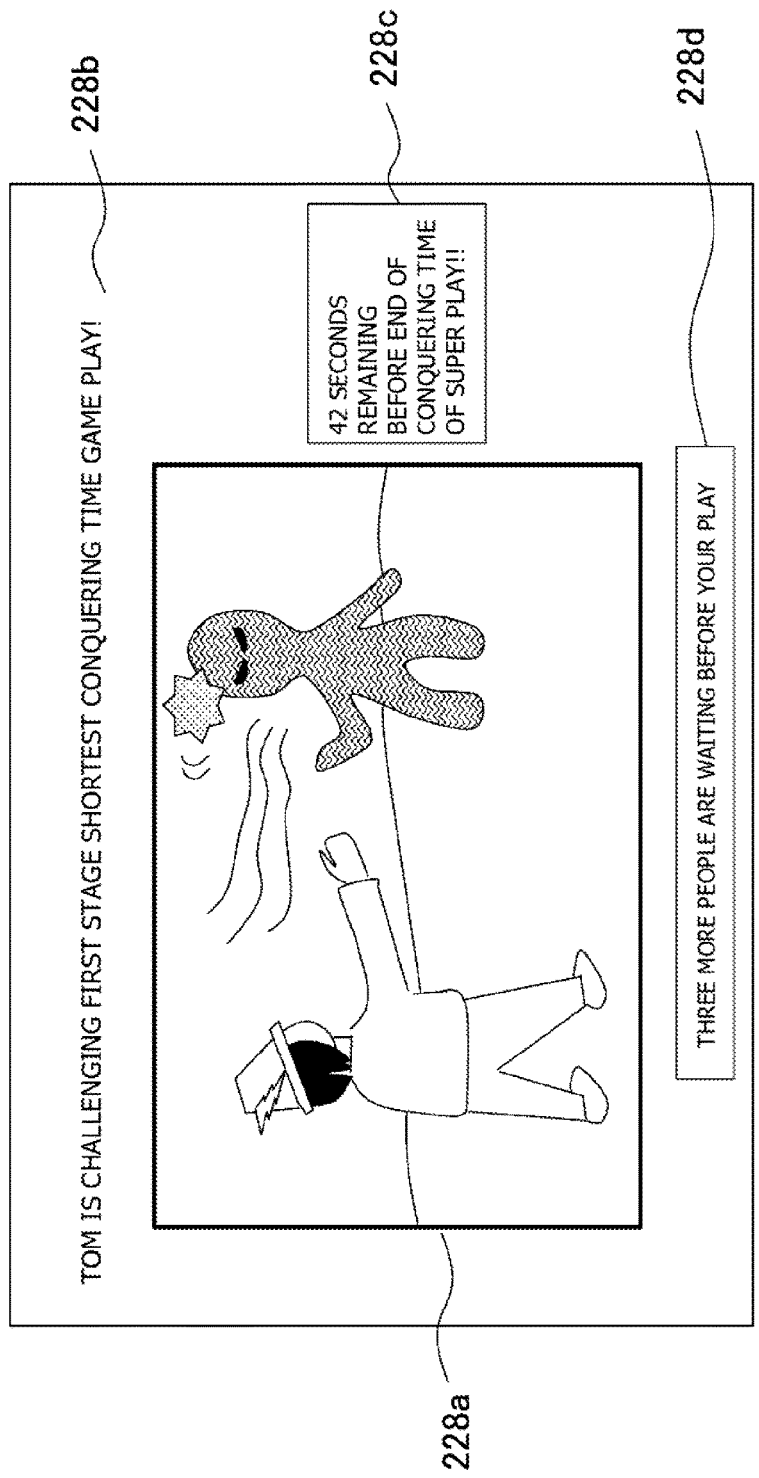
FIG. 20 is a diagram showing an example of a challenge play watching screen displayed on a client terminal as a challenge play watching entity in the present embodiment.

FIG. 20 shows an example of a challenge play watching screen displayed on the client terminal 10b as a challenge play watching entity in S104 in FIG. 19. This screen assumes a situation in which a user who requested a challenge play is watching the challenge play of another user while waiting on a waiting list. However, the challenge play of another person may be allowed to be watched irrespective of the request for the challenge play of the user himself/herself. Incidentally, a screen displaying the live image of the challenge play of the challenger which screen is displayed on the client terminal 10c as a challenge entity may have a similar configuration to that shown in FIG. 20.

The challenge play watching screen 226 displays a live image 228a of the challenge play, character information 228b showing characteristics of the game play being challenged and the challenger, and comparison information 228c comparing the original super play with the present challenge play in real time. In the present example, the super play with a shortest conquering time in the "first stage" is challenged. Thus, a time from a start of the "first stage" in the challenge play is measured, and a time remaining before the record of the shortest conquering time of the super play is reached is displayed as the comparison information 228c.

When the "first stage" can be conquered before the record of the shortest conquering time is reached, it means that the challenge play has won over the super play. In this case, the challenge play is set as a new super play, and the moving image of the new super play is included in the disclosure image. A general processing procedure at this time is similar to that shown in FIG. 16. However, the content providing server 62 has already obtained the output data of the challenge play, and also the evaluation criteria are limited. Therefore processing related to data transmission and reception and evaluation can be simplified. Incidentally, whether or not to remove the original super play whose record is broken from super plays may be determined according to a defending ratio thus far, the number of people who desire a challenge play, or the like.

The challenger who has won against the super play may be given a valuable item in an ordinary game play next time, or may be given bonus points. The given item or the given points may be changed according to the degree of difficulty of the challenged super play, the defending ratio thus far, or the like. In addition, the comparison information 228c is not limited to that shown in FIG. 20. Items other than the evaluation item as a factor in the challenge play becoming a super play may also be displayed in the form of a comparison table or the like. Alternatively, the moving image itself of the super play may be displayed by the side of the live image 228a of the challenge play. Particularly in the case of a racing game in which players compete with each other in speed or the like, relative superiority can be grasped at a glance by comparing the images themselves with each other. Also in this case, character information or a numerical value for comparison may be displayed in each of the images.

In a case where the user viewing the watching screen is waiting on the waiting list for a challenge play, the challenge play watching screen 226 further displays character information 228d indicating the present value of the number of people on the waiting list before the turn of the user arrives. This makes it possible to watch the challenge play of another person with a sense of exaltation about the approaching of the turn of the challenge play of the user himself/herself. As described above, different kinds of interest or enjoyment from those obtained from the contents of the game can be provided by not only simply allowing the moving image of the super play to be viewed but also giving an opportunity to challenge the super play and further allowing the challenge play to be watched. In addition, when a large number of people gather around one super play at the same time, the place of disclosure of moving images can be activated.

Incidentally, FIGS. 18 to 20 show a mode in which a challenge play is requested during the viewing of a moving image. However, a challenge play may be allowed to be requested during the watching of a game play or after an end of the watching. In this case, a GUI for requesting a challenge as shown in FIG. 18 is displayed in the disclosure image 214 for watching which disclosure image is shown in FIG. 15. Also in this case, the live screen of the challenge play which screen is similar to that of FIG. 20 can be displayed by similar processing to the processing in the case of a moving image. Incidentally, when the turn of the user viewing the challenge play watching screen as shown in FIG. 20 arrives, the display region of the live image 228a on the same screen (browser) is changed to the live image of the challenge play of the user. Also in conditions in which a challenge play can be performed immediately during the watching of a game play or during the viewing of a moving image, display is similarly changed to the live image of the challenge play on the same browser. Thus, when the challenge play is started during the watching or in the middle of the moving image, a play image during the watching or the viewing makes a seamless transition to the image of the challenge play of the user himself/herself.

Figure 21:
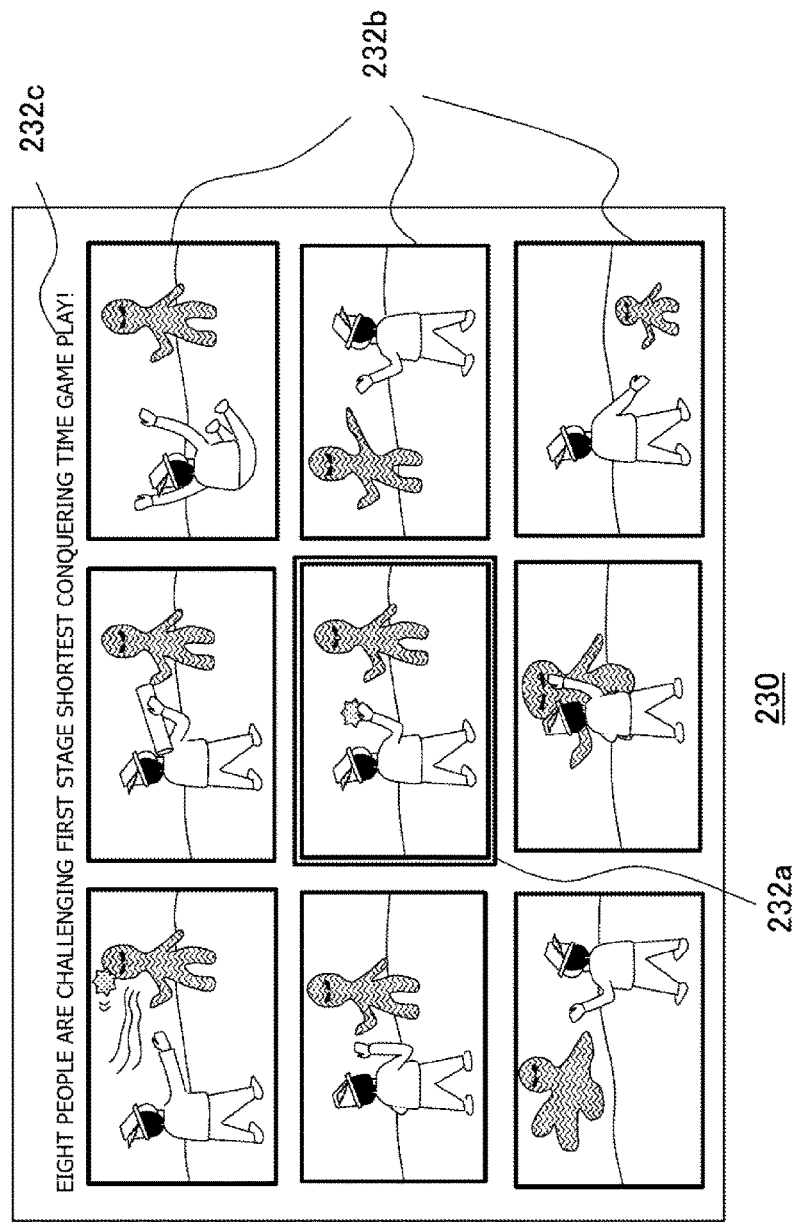
FIG. 21 is a diagram showing an example of a challenge play watching screen displayed on the client terminal as a challenge play watching entity in the present embodiment.

FIG. 21 shows another example of a challenge play watching screen. As an assumption, the present example allows a plurality of challengers to challenge one super play at the same time. That is, the challenge plays of the plurality of challengers are performed on a plurality of streaming servers 60, and the content providing server 62 aggregates the output data of the challenge plays and thereby constructs a challenge play watching screen including a plurality of live images. A screen displayed on a client terminal 10 as a challenge entity operated by each challenger may have a similar configuration to that of the screen of FIG. 21, or may be only a live image of the challenge play of the challenger himself/herself, or may be only a live image of the challenge play of the challenger himself/herself and a moving image of the super play being challenged, for example.

The challenge play watching screen 230 in the present example displays a moving image 232*a* of the super play at a center, and displays eight live images 232*b* of challenge plays in such a manner as to surround the moving image 232*a* of the super play at the center. The challenge play watching screen 230 further displays character information 232*c* indicating characteristics of the game play being challenged and the number of challengers. In this case, all of the challenge plays are started simultaneously in a same scene, for example a first scene of the moving image of the super play. Of course, the moving image of the super play also starts to be reproduced at the same time as the start of the challenge plays. This enables comparison of the progress of battles of all game plays including the super play.

Thus, not only challenges to the super play but also competition with other challengers occur, so that watching and the challenges can be made more thrilling. Incidentally, the arrangement and number of images are not particularly limited. In addition, the avatars of the challengers, present scores, the progress of the battles, and the like may be displayed as images or characters by being superimposed on each live image, for example. Thereby, watchers can support a particular challenger, and also a comparison that is not clearly made in game images can be made easily. Further, the number of challenge plays may be reduced by selecting dropouts by predetermined criteria in the middle of the challenge plays.

For example, a challenge play falling behind the super play in score by a predetermined amount or more is forcefully terminated even in the middle of the game. Then, the corresponding live image is excluded from the display objects. When the area of the remaining live images is increased as the number of live images is decreased, dynamism as in a survival game or the like occurs, thus making watching more interesting. A one-on-one game against the moving image of the super play may be executed ultimately by reducing the challenge plays to one, or challenge plays remaining when the number of challenge plays is reduced to a predetermined number may be allowed to be played to an end.

According to the present embodiment described above, in a system in which a game image is generated on the side of a server according to user operation on a client terminal, and the data of the game image is transmitted to the client terminal, the server evaluates each game play according to game conditions, and selects an excellent game play as a super play. Information on the selected super play is disclosed on a home page or the like so that other users can watch and view the super play. Thus, even when an enormous number of game plays are performed every day, a game play worth disclosure can be extracted by fair evaluation criteria with high accuracy. As a result, a user who desires watching or moving image viewing can enjoy contents of good quality while minimizing an effort and a time involved in a search or the like.

Items used for evaluation are set multilaterally according to the contents of the game. This enables characteristics of the contents to be grasped before actual watching/viewing is performed. In addition, by setting evaluation items in detail, and selecting a super play for each of the evaluation items, game plays or moving images that meet various needs of users can be found efficiently. Further, because of the use of an environment in which information on game plays is aggregated in a server, evaluation objects range widely, and therefore a place of disclosure can be provided to even the game play of a player who does not have an idea of showing the game play of the player himself/herself to others. Thus, suitable matching with watchers/viewers can be achieved.

In addition, every excellent game play is extracted, and a player is notified that the game play of the player is extracted as an excellent game play. Thus, an objective or a motivation different from the enjoyment of the game can be provided. In addition, an opportunity to challenge the super play of a moving image is provided during the viewing of the moving image, and other users are allowed to watch the challenge play. This enables a player not only to simply wait for the game play of the player to be selected as a super play but also to make a challenge for himself/herself at a special opportunity to win against a super play while attracting public attention.

In this case, challenges are made not only by players being connected online, but also to fixed contents, that is, the moving images of super plays. Thus, the quality of the game plays can be maintained. In addition, users who desire to challenge a super play and users who desire to watch the challenge play do not tend to disperse, but people tend to gather. As a result, a lively place can be constructed on a network at all times. In this case, as a result of limiting the number of parallel executions of challenge plays, an increase in processing cost of servers can be prevented, and a swell of interest can be expressed by the number of people on a waiting list.

The present disclosure has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present disclosure.

For example, in the present embodiment, a disclosure image showing viewing object candidates is displayed first, and a moving image as a viewing object is reproduced according to a selecting input in the disclosure image by a user. However, a trigger for moving image reproduction is not limited to this. For example, a player who is in difficulty by failing in a same scene consecutively, for example, is prompted to view a moving image that serves as a hint for success. In this case, when the number of failures in the same scene has reached a predetermined number, the content providing server 62 extracts a super play corresponding to the scene, and requests the streaming server 60 to display a message box suggesting the viewing of a moving image of the super play or a GUI for reproducing the moving image.

A super play is selected for each scene, each enemy, and the like, and conditions such as weapons and the like are identified on the basis of evaluation units. Thus, an appropriate moving image matching a level and conditions can be extracted easily. In addition, when a user who has thus viewed the moving image of the super play resumes the game of the user, the game may be started in a state in which conditions in the moving image are reflected, obtained items may be increased, or a character that helps the user to succeed may be allowed to appear, so that the details or conditions of the game become advantageous to the user. This makes it easy for the user to overcome the difficult situation, and thus enables the user to maintain a motivation for the game.

In addition, in the present embodiment, a super play is surely extracted by making automatic super play selection regardless of the intention of a player. However, the intention of a player may be reflected. For example, during a game play, a scene for making a challenge to make the game play recognized as a super play may be provided, and the play may be set as an evaluation object when the user makes the challenge. Alternatively, the user may be allowed to input a selection as to whether the game play is to be subjected to evaluation to be recognized as a super play at a time of a start of the game or the like. This makes it possible to give consideration to users who desire to enjoy games only privately.

What is claimed is:

1. A content providing method for a content providing server to provide contents to client terminals via a network, the method comprising:
    obtaining play data indicating progress conditions of a computer game that starts at a game start time and progresses according to operation of a user on the client terminals;
    during the computer game progress, periodically recording data conditions of the computer game progress;
    during the game progress, evaluating game plays of the game progress by at least one predetermined evaluation item on a basis of the play data, each game play being a respective excerpt of the game progress that is less than the entire game progress and having a respective game play start time after the game start time and a respective game play duration;
    during the game progress, selecting without awareness by the user an evaluated game play according to an evaluation result and using the play data of the selected game play to reproduce the game play to generate a moving image of the reproduced game play, the reproduced game play having associated therewith at least one of the data conditions recorded during progression of the game; and
    during the game progress, distributing the data of the moving image to the client terminals via the network;
    during the game progress, receiving a request to challenge the game play shown in the moving image; and
    in response to the request, during the game progress, starting another instance of the game, at the game play start time of the game play shown in the moving image, to be played by another user for the duration of the game play shown in the moving image, with at least one data condition substantially similar to the at least one data condition associated with the game play shown in the moving image, and at least one data condition substantially different to at least one other data condition associated with the game play shown in the moving image, the different date condition being established by the another user prior to the start time of the another instance of the game.

2. The content providing method according to claim 1, further comprising:
    receiving, by the content providing server, a request to execute the game corresponding to the moving image from one of the client terminals to which the moving image is distributed;
    executing, by the content providing server, the corresponding game, making the game progress according to user operation on the client terminal as an execution request source, and generating data of a real-time game image; and
    instantly transmitting, by the content providing server, the data of the real-time game image to the client terminal as the execution request source.

3. The content providing method according to claim 2, further comprising:
    determining, by the content providing server, relative superiority by comparing a game play executed according to the execution request with the game play corresponding to the moving image by one of the evaluation items;
    wherein the obtaining the data of the moving image of the game play changes the extracted game play according to a result of the determined relative superiority.

4. The content providing method according to claim 3, wherein the distributing distributes, together with the data of the moving image, information for displaying cumulative information on results of comparison of other game plays executed in a past according to requests to execute the corresponding game with the game play corresponding to the moving image.

5. The content providing method according to claim 3, wherein the distributing distributes, together with the data of the moving image, information for displaying a total number of other game plays executed in a past according to requests to execute the corresponding game.

6. The content providing method according to claim 2, wherein the instantly transmitting successively transmits the data of the real-time game image also to a client terminal other than the client terminal as the execution request source.

7. The content providing method according to claim 2, wherein when execution requests equal to or more than an upper limit set to a number of parallel executions of the game are received in the receiving the request to execute the game, a queue of client terminals requesting execution of the game is formed, and
    the instantly transmitting successively transmits the data of the real-time game image to the client terminals belonging to the queue, and requests the client terminals belonging to the queue to display information about positions of the client terminals in the queue.

8. The content providing method according to claim 2, wherein the generating the data of the real-time game image generates data of a plurality of real-time game images showing a plurality of game plays corresponding to a plurality of client terminals, respectively, by executing the game in parallel, and
    the instantly transmitting instantly transmits the data of the plurality of real-time game images, and transmits data for displaying a list of the plurality of real-time game images.

9. The content providing method according to claim 8, further comprising:

continuously comparing, by the content providing server, the plurality of game plays with the game play corresponding to the moving image by one of the evaluation items during progress of the game in the generating the data of the real-time game image;

wherein the instantly transmitting decreases a number of the plurality of real-time game images, the data of the plurality of real-time game images being transmitted, by a predetermined rule on a basis of a comparison result in the continuously comparing.

10. The content providing method according to claim 1, wherein the evaluating evaluates game plays in progress, and the distributing distributes data of a real-time game image of a game play in progress extracted according to an evaluation result.

11. The content providing method according to claim 1, further comprising:

generating, by the content providing server, a disclosure image displaying a list of information corresponding to moving images of a plurality of game plays extracted respectively according to evaluation results for a plurality of evaluation items in the evaluating;

distributing, by the content providing server, data of the disclosure image to a client terminal; and receiving, by the content providing server, information on a user operation for performing a search with an evaluation item as a key from the client terminal displaying the disclosure image;

wherein the distributing transmits data of a moving image of a game play extracted for the evaluation item as the key on a basis of the information on the user operation to the client terminal as a search source.

12. The content providing method according to claim 1, wherein the distributing determines data of a moving image as a distribution object for each client terminal by reading a filtering condition set to the game and personal information of each of users operating the client terminals as distribution destinations, the personal information being related to the game, from a storage device, and checking the personal information against the filtering condition.

13. A content providing server comprising:

a play data receiving section obtaining play data indicating progress conditions of a computer game that starts at a game start time and progresses according to operation of a user on client terminals;

a data condition recording section periodically recording, during the computer game progress, data conditions of the computer game progress;

a play evaluating section evaluating during the game progress game plays of the game progress by at least one predetermined evaluation item on a basis of the play data, each game play being a respective excerpt of the game progress that is less than the entire game progress and having a respective game play start time after the game start time and a respective game play duration;

a play reproducing section selecting during the game progress, without awareness by the user, an evaluated game play according to an evaluation result and using the play data of the selected game play to reproduce the game play to generate a moving image of the reproduced game play, the reproduced game play having associated therewith at least one of the data conditions recorded during progression of the game, and during the game progress distributing the data of the moving image to the client terminals; and a challenge request receiving section receiving during the game progress a request to challenge the game play shown in the moving image, and in response to the request, during the game progress starting another instance of the game, at the game play start time of the game play shown in the moving image, to be played by another user for the duration of the game play shown in the moving image, with at least one data condition substantially similar to the at least one data condition associated with the game play shown in the moving image, and at least one data condition substantially different to at least one other data condition associated with the game play shown in the moving image, the different date condition being established by the another user prior to the start time of the another instance of the game.

14. A content providing system comprising:

a client terminal including an input information transmitting section transmitting a request to view a moving image of a game play of a computer game to a server, and an output section outputting data of the moving image transmitted from the server according to the request to view the moving image; and the server including a play data receiving section obtaining play data indicating progress conditions of a computer game that starts at a game start time and progresses according to operation of a user on each of a plurality of client terminals, a data condition recording section periodically recording, during the computer game progress, data conditions of the computer game progress, a play evaluating section evaluating during the game progress game plays of the game progress by at least one predetermined evaluation item on a basis of the play data, each game play being a respective excerpt of the game progress that is less than the entire game progress and having a respective game play start time after the game start time and a respective game play duration, a play reproducing section selecting during the game progress, without awareness by the user, an evaluated game play according to an evaluation result and using the play data of the selected game play to reproduce the game play to generate a moving image of the reproduced game play, the reproduced game play having associated therewith at least one of the data conditions recorded during progression of the game, and during the game progress transmitting the data of the moving image to the client terminal as a transmission source of the request to view the moving image, and a challenge request receiving section receiving during the game progress a request to challenge the game play shown in the moving image, and in response to the request, during the game progress starting another instance of the game, at the game play start time of the game play shown in the moving image, to be played by another user for the duration of the game play shown in the moving image, with at least one data condition substantially similar to the at least one data condition associated with the game play shown in the moving image, and at least one data condition substantially different to at least one other data condition associated with the game play shown in the moving image, the different date condition being established by the another user prior to the start time of the another instance of the game.

15. A content providing method for a content providing server to provide contents to client terminals via a network, the method comprising:
obtaining play data indicating progress conditions of a computer game progressing according to user operation on the client terminals;
evaluating game plays by each predetermined evaluation item on a basis of the play data;
obtaining data of a moving image of a game play extracted according to an evaluation result; and
distributing the data of the moving image to the client terminals via the network;
the method further comprising:
receiving, by the content providing server, a request to execute the game corresponding to the moving image from one of the client terminals to which the moving image is distributed;
executing, by the content providing server, the corresponding game, making the game progress according to user operation on the client terminal as an execution request source, and generating data of a real-time game image; and
instantly transmitting, by the content providing server, the data of the real-time game image to the client terminal as the execution request source;
the method further comprising:
determining, by the content providing server, relative superiority by comparing a game play executed according to the execution request with the game play corresponding to the moving image by one of the evaluation items;
wherein the obtaining the data of the moving image of the game play changes the extracted game play according to a result of the determined relative superiority;
and wherein the distributing distributes, together with the data of the moving image, information for displaying a total number of other game plays executed in a past according to requests to execute the corresponding game.

16. A content providing method for a content providing server to provide contents to client terminals via a network, the method comprising:
obtaining play data indicating progress conditions of a computer game progressing according to user operation on the client terminals;
evaluating game plays by each predetermined evaluation item on a basis of the play data;
obtaining data of a moving image of a game play extracted according to an evaluation result; and
distributing the data of the moving image to the client terminals via the network;
the method further comprising:
receiving, by the content providing server, a request to execute the game corresponding to the moving image from one of the client terminals to which the moving image is distributed;
executing, by the content providing server, the corresponding game, making the game progress according to user operation on the client terminal as an execution request source, and generating data of a real-time game image; and
instantly transmitting, by the content providing server, the data of the real-time game image to the client terminal as the execution request source;
and wherein when execution requests equal to or more than an upper limit set to a number of parallel executions of the game are received in the receiving the request to execute the game, a queue of client terminals requesting execution of the game is formed, and the instantly transmitting successively transmits the data of the real-time game image to the client terminals belonging to the queue, and requests the client terminals belonging to the queue to display information about positions of the client terminals in the queue.

17. A content providing method for a content providing server to provide contents to client terminals via a network, the method comprising:
obtaining play data indicating progress conditions of a computer game progressing according to user operation on the client terminals;
evaluating game plays by each predetermined evaluation item on a basis of the play data;
obtaining data of a moving image of a game play extracted according to an evaluation result; and
distributing the data of the moving image to the client terminals via the network;
the method further comprising:
receiving, by the content providing server, a request to execute the game corresponding to the moving image from one of the client terminals to which the moving image is distributed;
executing, by the content providing server, the corresponding game, making the game progress according to user operation on the client terminal as an execution request source, and generating data of a real-time game image; and
instantly transmitting, by the content providing server, the data of the real-time game image to the client terminal as the execution request source;
wherein the generating the data of the real-time game image generates data of a plurality of real-time game images showing a plurality of game plays corresponding to a plurality of client terminals, respectively, by executing the game in parallel, and the instantly transmitting instantly transmits the data of the plurality of real-time game images, and transmits data for displaying a list of the plurality of real-time game images;
the method further comprising:
continuously comparing, by the content providing server, the plurality of game plays with the game play corresponding to the moving image by one of the evaluation items during progress of the game in the generating the data of the real-time game image;
wherein the instantly transmitting decreases a number of the plurality of real-time game images, the data of the plurality of real-time game images being transmitted, by a predetermined rule on a basis of a comparison result in the continuously comparing.

* * * * *